United States Patent
Ranzinger et al.

(10) Patent No.: US 10,503,775 B1
(45) Date of Patent: Dec. 10, 2019

(54) COMPOSITION AWARE IMAGE QUERYING

(71) Applicant: SHUTTERSTOCK, INC., New York, NY (US)

(72) Inventors: Mike Ranzinger, Boulder, CO (US); Heath Hohwald, Logrono (ES)

(73) Assignee: SHUTTERSTOCK, INC., New York, NY (US)

( * ) Notice: Subject to any disclaimer, the term of this patent is extended or adjusted under 35 U.S.C. 154(b) by 205 days.

(21) Appl. No.: 15/393,201

(22) Filed: Dec. 28, 2016

(51) Int. Cl.
*G06F 16/56* (2019.01)
*G06N 3/08* (2006.01)
*G06F 16/51* (2019.01)
*G06F 16/583* (2019.01)
*G06F 16/2457* (2019.01)

(52) U.S. Cl.
CPC ........ *G06F 16/56* (2019.01); *G06F 16/24578* (2019.01); *G06F 16/51* (2019.01); *G06F 16/5854* (2019.01); *G06N 3/08* (2013.01)

(58) Field of Classification Search
CPC ......... G06F 17/30256; G06F 17/30286; G06F 17/30864; G06F 16/51; G06F 16/56; G06F 16/5854; G06F 16/24518
USPC ........................................................ 707/723
See application file for complete search history.

(56) References Cited

U.S. PATENT DOCUMENTS

| | | | | |
|---|---|---|---|---|
| 8,352,465 B1* | 1/2013 | Jing | .................. | G06F 17/30867 707/723 |
| 9,635,276 B2* | 4/2017 | Sen | ..................... | H04N 5/2353 348/222 |
| 2006/0101060 A1* | 5/2006 | Li | ..................... | G06F 17/30247 707/802 |
| 2010/0332210 A1* | 12/2010 | Birdwell | ........... | G06F 17/30442 707/737 |
| 2011/0317923 A1* | 12/2011 | Hondo | ............. | G06F 17/30247 382/190 |

(Continued)

OTHER PUBLICATIONS

Razinger et al., "Compositino Aware Search," Whitepaper downloaded Nov. 2017 from https://www.shutterstock.com/labs/compositionsearch/whitepaper, 9 pages.

(Continued)

*Primary Examiner* — Shahid A Alam
(74) *Attorney, Agent, or Firm* — McDermott Will & Emery LLP

(57) ABSTRACT

Various aspects of the subject technology relate to systems, methods, and machine-readable media for composition aware image querying. A system may receive user input identifying a search query for content from a client device, where the user input indicates one or more queries assigned to one or more regions of a search input page. The system may generate a query vector for each query using a computer-operated neural language model. The system may compare the query vector to an indexed vector for each region of an image. The system may determine a listing of composition-specific images from a collection of images based on the comparison. The system may determine a ranking for each image in the listing of composition-specific images, and provide search results responsive to the search query to the client device. The search results may include a prioritized listing of the composition-specific images based on the determined ranking.

18 Claims, 15 Drawing Sheets

(56) References Cited

U.S. PATENT DOCUMENTS

2013/0148910 A1* 6/2013 Fredembach ............ G06K 9/40
382/275
2015/0058327 A1* 2/2015 Frank ..................... G06Q 10/06
707/722

OTHER PUBLICATIONS

Mai et al., "Spatial-Semantic Image Search by Visual Feature Synthesis," downloaded Nov. 2017 from http://openaccess.thecvf.com/content_cvpr_2017/papers/Mai_Spatial-Semantic_Image_Search_CVPR_2017_paper.pdf, pp. 4718-4727.

* cited by examiner

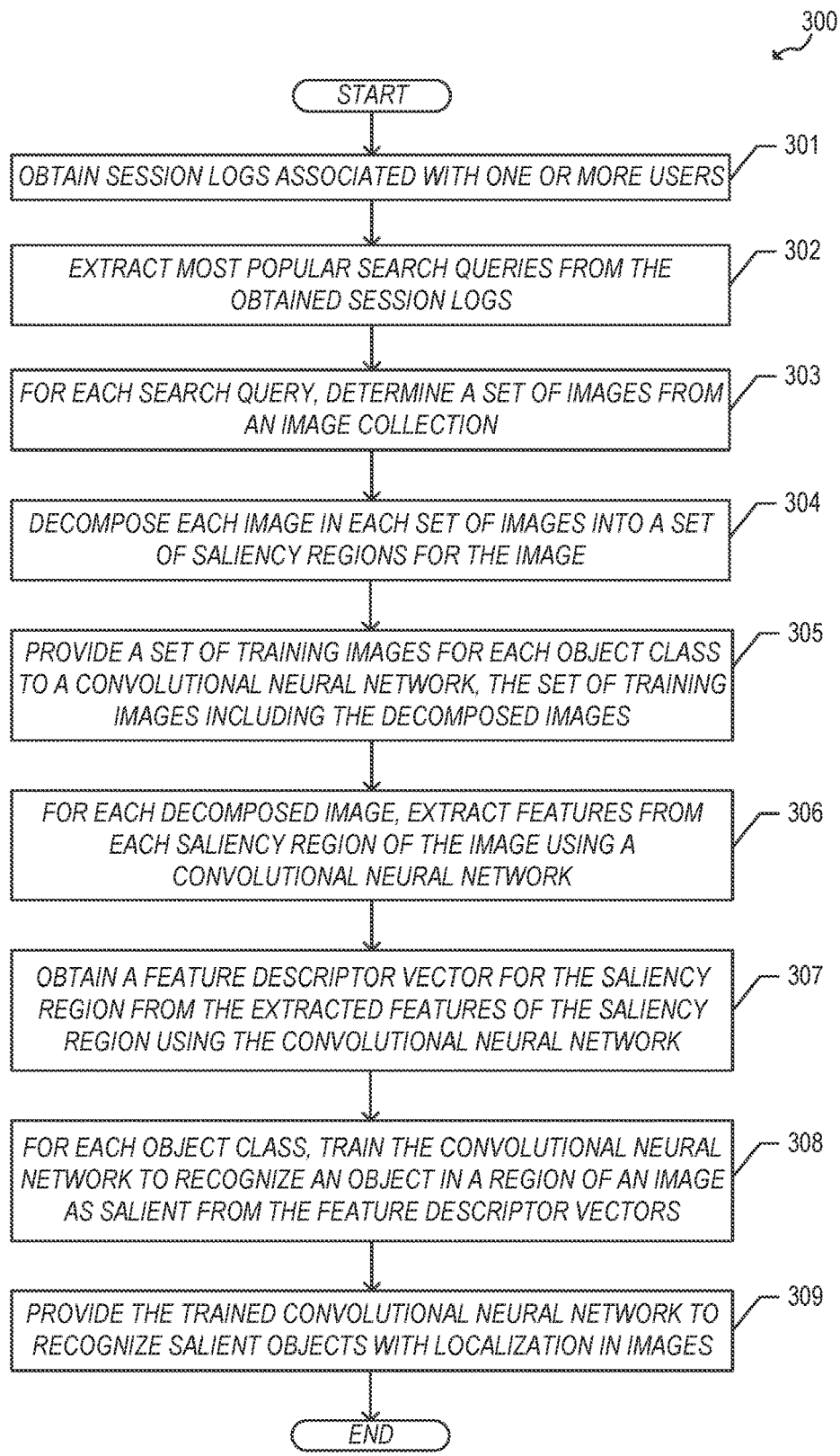

COMPOSITION AWARE IMAGE QUERYING

BACKGROUND

Field

The present disclosure generally relates to a computer-operated image retrieval system, and more particularly to composition aware image querying.

Description of the Related Art

When a user performs a search of a collection of items using a search query, an information retrieval (IR) system commonly matches a user's search terms with content items from the collection that are most relevant to a user's query. The problem of finding a desired multimedia item in a very large collection can be quite daunting. With potentially hundreds of millions of items, the task for the IR system of indicating to a user the item (e.g., image or images) that closely matches the semantic concept and its location within the item that the user had in mind is challenging.

SUMMARY

The present disclosure describes a system that maps an input image to a saliency map that identifies both the contents (and objects) present in an image as well as their location in the image, which are identified by a relative strength at either the pixel level or over a discretized grid. This mapping can be used to provide composition aware image querying that allows a user to annotate a search input page, such as a canvas, with regions that should contain certain visual content. This enables the user to search for images with important objects in a desired location within the image, or return an image with a blank area that can be used for placing additional content into the image.

According to one embodiment of the present disclosure, a computer-implemented method is provided. The method includes receiving user input identifying a search query for content from a client device, the user input indicating one or more queries assigned to one or more regions of a search input page. The method includes generating a query vector for each of the one or more queries using a computer-operated neural language model. The method includes comparing the query vector to an indexed vector for each of the one or more regions of an image. The method includes determining a listing of composition-specific images from a collection of images based on the comparing. The method includes determining a ranking for each image in the listing of composition-specific images. The method also includes providing a set of search results responsive to the search query to the client device, the set of search results including a prioritized listing of the composition-specific images based on the determined ranking.

According to one embodiment of the present disclosure, a system is provided including one or more processors and a computer-readable storage medium coupled to the one or more processors, the computer-readable storage medium including instructions. The instructions cause the one or more processors to receive user input indicating one or more data points at one or more locations of a search input page from a client device, each of the one or more data points indicating a specific query. The instructions also cause the one or more processors to provide each specific query to a trained computer-operated neural language model. The instructions also cause the one or more processors to obtain a query vector for each specific query of the user input from the trained computer-operated neural language model. The instructions also cause the one or more processors to obtain an indexed grid of image vectors from a data structure for each image of an image collection. The instructions also cause the one or more processors to compare each query vector to the indexed grid of image vectors for each image. The instructions also cause the one or more processors to produce a heat map of each specific query for each image based on the comparison. The instructions also cause the one or more processors to, for each image, compute an overall score for the image relative to where the one or more data points were located on the search input page based on the heat map for each specific query and the user input. The instructions also cause the one or more processors to provide a prioritized listing of images from the image collection based on the computed overall score for each image.

According to one embodiment of the present disclosure, a non-transitory computer readable storage medium is provided including instructions that, when executed by a processor, cause the processor to perform a method. The method includes receiving user input identifying a search query for content from a client device, the user input indicating one or more queries assigned to one or more regions of a search input page. The method includes generating a query vector for each of the one or more queries using a computer-operated neural language model. The method includes comparing the query vector to an indexed vector for each of the one or more regions of an image. The method includes determining a listing of composition-specific images from a collection of images based on the comparing. The method includes determining a ranking for each image in the listing of composition-specific images. The method also includes providing a set of search results responsive to the search query to the client device, the set of search results including a prioritized listing of the composition-specific images based on the determined ranking.

According to one embodiment of the present disclosure, a system is provided that includes means for receiving user input identifying a search query for content from a client device, in which the user input indicates one or more queries assigned to one or more regions of a search input page; and means for 1) generating a query vector for each of the one or more queries using a computer-operated neural language model, 2) comparing the query vector to an indexed vector for each of the one or more regions of an image, 3) determining a listing of composition-specific images from a collection of images based on the comparing, 4) determining a ranking for each image in the listing of composition-specific images, and 5) providing a set of search results responsive to the search query to the client device, in which the set of search results includes a prioritized listing of the composition-specific images based on the determined ranking.

According to one embodiment of the present disclosure, a computer-implemented method is provided. The method includes receiving user input via an application on a client device to initiate an image search, the user input indicating one or more queries assigned to one or more regions of a search input page. The method includes generating, in response to the received user input, an image search query from the received user input. The method includes providing for transmission the image search query over a connection to a server, the server including an image search service that obtains one or more composition-specific images responsive to the image search query based on a cosine similarity between a query vector associated with the image search query and one or more indexed vectors of corresponding images from an image collection. The method includes receiving a set of search results responsive to the image search query from the server, the set of search results including a prioritized listing of the composition-specific images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3A illustrates an example offline process of training a convolutional neural network for identification of composition with localization in an image using the example server of FIG. 2.

DETAILED DESCRIPTION

Figure 1:
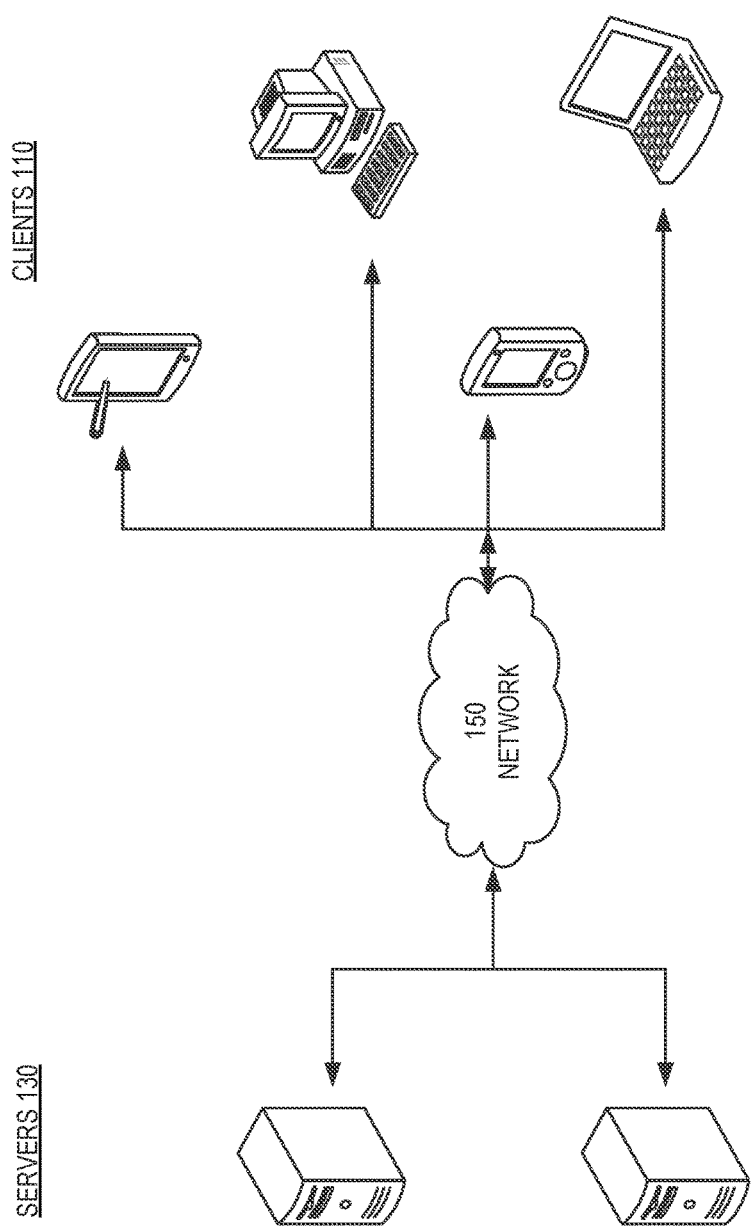
FIG. 1 illustrates an example architecture for composition aware image querying suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. As used herein, the term "saliency" may refer to the quality by which an object within an image (e.g., a foreground object) is deemed most useful for a neural network to perform the classification task. The term "saliency map" as used herein may refer to a mapping where each pixel has an associated value with its particular saliency value, where the saliency value of a pixel may refer to as the normalized attention that the pixel has in the overall scene. The term "training data" as used herein may refer to as a set of images containing positive instances of desired classes used to train an object classifier. As used herein, the term "search term" may refer to a word in a query or portion of a query comprised of a string of text, which may be a single term or multiple terms.

General Overview

A very common workflow for a user of an image retrieval (IR) system is beginning with a mental conception of an ideal image for a particular purpose. The user then issues a textual query to the IR system where the query is intended to capture in words their mental conception. The IR system then returns a set of images, at which point the user browses through the images, many of which are likely irrelevant, hoping to find one that is relevant. Composition is often an important factor in identifying a relevant image. Moreover, it is distracting to users to look at entire images when the factor they care about may be a certain composition of the image.

Composition aware image querying includes decomposing all images of an image collection into saliency regions for the image. A deep-learning neural network can be trained to localize a given trained class/query down to a certain number of regions of the image. This localization is latent in what the deep-learning neural network needs to learn in order to correctly classify a test dataset, which may include a predetermined number of top queries leading to downloads over a specified date range. A drawback to this localization is that it requires the deep-learning neural network to have trained on that specific class/query. Therefore, the deep-learning neural network would be limited to the predetermined number of top queries in this manner. In one or more implementations, the subject disclosure provides for the implementation of query-to-vector technology, where the deep-learning neural network learns how to map an arbitrary input query into a vector in the image embedding space. The subject system can use that query vector as a proxy for the class weights because the deep-learning neural network is trained to minimize the cosine distance between the image vector and the query vector. Given an image, instead of only storing a single vector for an image, the disclosed system can index a vector for each of the regions in the image, because each of those vectors can construct a saliency map for a defined class. At runtime, the disclosed system enables a user to annotate a canvas where specific regions are assigned a query. The disclosed system can then generate a class vector for each of those regions using a trained neural language model, and search an index for images that contain strong evidence of the specified query in the specified region. Similarity between the images can be based on the cosine distance between the indexed vector for the region, and the query vector for the region. Ranking can be based on the number of salient regions matched, and then by their intersection-over-union coverage ratios in some implementations. A use case may be where a user knows that the user needs to place additional content into an area of an image, and so the user searches for important concepts to both to be present in an image and in the specified locations, hence making it easier for a user with a specific idea for an image to find relevant images relatively quickly.

In one or more implementations, the disclosed system includes compositional search, where a user can describe a scene or layout as a compositional input and initiate an image search directly based on the compositional input. The compositional search can be facilitated by a user interface that enables the user to specify a composition for an image. The user can specify a layout to indicate that a representation of a "dog" should be on the left of a representation of a "cat", or conversely, that the representation of the "cat" should be on the right of the representation of the "dog". In one or more implementations, the user interface can enable the user to provide data points indicating objects, and each of those objects is a search term. For example, a user can interact with the user interface by clicking somewhere on a canvas and type the term "cat", resulting in a data point appearing on the search input page along with an annotation (e.g., the term "cat") for the data point. The disclosed system can then use Voronoi partitioning of the plane. The disclosed system can assign a value for the border/background (e.g., "white" or "grass"), such that the disclosed system can select the data point corresponding to "cat" to adjust its size on the canvas to initiate a search for similar sized representations of "cat" in images. The user can provide exact positioning of the data points (e.g., supplied coordinates) in some embodiments, or the user can indicate relative positioning of the data points in other embodiments. The compositional search may be used to initiate a search for images by color and/or generate new content for insertion into specific regions of an image.

In one or more implementations, the disclosed system allows users to describe an ideal composition using a predetermined number of icons in a tool bar for the compositional search interface. The disclosed system enables the user to drag icons from the tool bar onto a canvas and then position and resize the icons to the user's preferences to indicate what the intended composition should resemble. For example, if a user desires a composition with a representation of a "woman" in a bottom-right location as a foreground object, including other object representations in a particular arrangement, then the user can select the respective icons from the tool bar and arrange them in the canvas as such. As a further refinement, the disclosed system can supply a query box that, as the user types, suggests one or more icons to be selected and moved into the canvas. This may enable users, including users that use other spoken languages (e.g., non-English speakers), to describe pictorially for what the user is searching.

The disclosed system addresses a problem in the traditional IR systems, discovery of the most relevant images by composition, which is a problem specifically arising in the realm of computer technology, by providing a solution also rooted in computer technology, namely, by considering a search engine system using an object classifier for classifying salient objects in images using a salient map of the images and identifying these salient objects in image search results. The object classifier can classify the strength with which an image exhibits certain known objects. The system may use an algorithm that detects the set of objects from a set of example images, referred to as training data. The disclosed system includes training of a series of computer-operated neural networks, such as a convolutional neural network, to teach the neural network to identify features of images mapping to certain object classes for identifying those images that are responsive to an input search query with a probability that a region of an image is deemed salient. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image, and then process those features against a number of object classes. The disclosed system produces a set of vectors representing the object classifications for the corpus of images in the training data. The objects are learned from running the convolutional neural network over a corpus of the training data. The trained convolutional neural network can provide a probability distribution where each data point in the distribution corresponds to likelihood that the image includes a corresponding object. In one or more implementations, the trained convolutional neural network provides a probability that a region of an image is salient. The disclosed system determines the probability that such training image contains a salient object based on probabilistic computations per object class for that training image. Once the convolutional neural network has been trained to predict probabilistically which features of the training images identify certain object classes, the disclosed system generates metadata for each example image indicating the salient object and its location within the image. In this respect, the disclosed system can then modify the original search results by incorporating items (e.g., thumbnails) that represent the salient objects for each original search result image.

The subject system provides several advantages including providing classified images that identify salient portions of the images. The system provides a machine learning capability where the system can learn from a content item and associated objects in order to refine search results with highly relevant content items. In this regard, the refined search results would yield content items with features that exploit the salient objects and their location within the images to facilitate the user's ability to filter through the search results. With this approach, the system can continually improve its accuracy (and keep up with trending differences of what certain salient objects look like) by incorporating user interaction data into its convolution-based salient map model. By presenting results to the user, identifying the media that a user interacts with (e.g., indicating which features among other features of an image received the most attention), and examining the results that a user ignores (e.g., indicating which features among other features of an image received the least attention), the system can continually learn and refine itself to match user preferences.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes and which regions of the images are deemed salient. At runtime, the search query produces a search space that includes items representing salient regions of images based on a salient map of each subject image from original search results, thus reducing the cost of images provided for display (i.e., less bandwidth resources). Given that the subject system continues to learn and refine itself to match user preferences from a search query, modifying search results in real-time to emphasize the most salient region of each image in a listing of images reduces the system latency due to a lesser amount of time needed for a user to locate a desired search result image.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for composition aware image querying suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient subjects. The servers 130 can return images tagged with metadata indicating one or more salient subjects and their locations within the images to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Composition Aware Image Querying System

Figure 2:
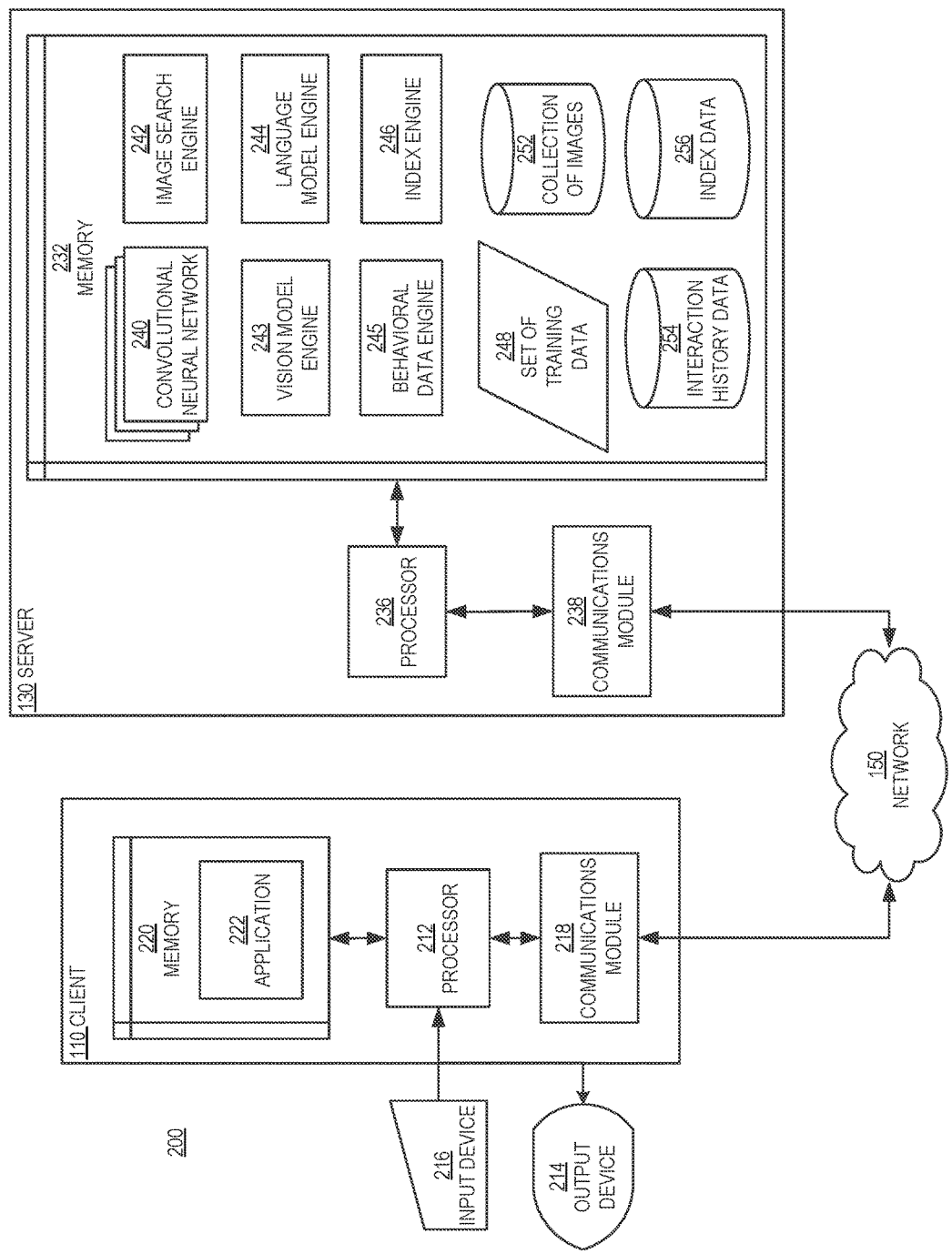
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240, an image search engine 242, a language model engine 244, a vision model engine 243, a behavioral data engine 245 and an index engine 246.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as AlexNet, GoogLeNet, or Visual Geometry Group models. In one or more implementations, the convolutional neural network 240 consists of a stack of convolutional layers followed by a single fully connected layer. In this respect, the fully connected layer is the layer that maps the convolutional features to one of a plurality of training classes. The convolutional neural network 240 can include a loss layer (e.g., softmax or hinge loss layer) to back propagate errors so that the convolutional neural network 240 learns and adjusts its weights to better fit provided image data. In one or more implementations, the final three layers of the convolutional neural network 240 includes a spatial operator layer, an average-over-width-height layer, and the fully connected layer as the classifier. The spatial operator layer may be configured to receive an input tensor of a configuration (e.g., batch size×number of feature maps×height×width), and produce an output tensor (e.g., batch size× number of new feature maps×new height×width). Examples of the spatial operator layer may include convolution, average pool, max pool, etc. The average-over-width-height layer may be configured to receive an input tensor of the configuration (e.g., batch size×number of feature maps× height×height), and produce an output tensor (e.g., batch size×number of feature maps) by averaging the values over the entire height and width of the tensor, per feature map. The fully connected layer may be configured to map the tensor of the configuration (e.g., batch size×number of feature maps), and produce a tensor (batch size×number of classes), where number of classes is based on the classification problem. To determine saliency, a vector after the averaged values from the average-over-width-height layer is obtained, and the cosine distance between the average vector against each vector (e.g., number of feature maps) from the previous spatial operator layer is then computed, thus producing a tensor of the configuration (e.g., batch size×height×width). In one or more implementations, the cosine distance between the output of the fully connected layer corresponding to a specified class and the output of the spatial operator layer is used to determine the saliency with respect to a specific class.

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes. Each of the images may include an indication of one or more salient objects present in the image based on the corresponding object classes applicable to the image. The images may be paired with image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. In one or more implementations, each input image may be decomposed into a set of non-overlapping regions, each of which may have uniform saliency values.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class. The set of training data 248 may include multiple instances (or sets) of training data, where at least one instance (or set) of training data is associated with an intended object class. For example, the set of training data 248 may include images that include features that represent positive instances of a desired class so that the convolutional neural network 248 can be trained to distinguish between images with a feature of the desired class and images without a feature of the desired class. The set of training data 248 also may include image vector information and image cluster information. In one or more implementations, the image vector information identifies training vectors representing a large sample of training images and the image cluster information identifies clusters representing respective semantic concepts. In this respect, the vectors corresponding to a semantic concept are clustered into one cluster representing that semantic concept. In one or more implementations, a predetermined number of object classes correspond to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The behavioral data engine 245 may be a module executed by the processor 236 that is configured to monitor (and/or track) user interactions with the search results from the image search engine 242. At runtime, the behavioral data engine 245 may facilitate incorporation of the gathered feedback by logging each occurrence of the query, image, salient object (or region) shown, and salient object (or region) selected. The behavioral data engine 245 may keep track of the frequency that a certain salient object or region is selected or which salient objects or regions are commonly selected.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on the salient objects or regions of the most-recent images downloaded or clicked by the user. For example, the processor 236 may determine that a user interacted with an image from a search result, such as, by clicking on a segment (or region) of the image identified as salient, saving the image for subsequent access, or downloaded the image to a client (e.g., client 110), or the like. The processor 236 may keep track of the user interactions with a number of images over a given time period. In one or more implementations, the processor 236 may track the learned salient objects or regions of the last N images that the user interacted with as well as a current user query, where N is a positive integer value. The interaction history 254 may also include data indicating search behavior (and/or patterns) relating to prior image search queries.

The vision model engine 243 may be a module executed by the processor 236 that is configured to identify the most salient and prominent objects in an image and their location within the image using the convolutional neural network 240. The vision model is trained to predict which query an image is more likely to belong to given the image. Based on the architecture of the vision model, the processor 236 may obtain localization from the image. The vision model can respond directly by indicating where are the mostly likely areas in an image that indicate where the query "man", for example, was located, and/or why the vision model indicated there was a representation of a "man" within the image. In one or more implementations, the processor 236 provides an example image to the vision model engine 243 such that the trained convolutional neural network 240 determines a saliency of each pixel in the example image with respect to an overall scene of the example image. In one or more implementations, the vision model engine 243 is configured to generate a saliency map of the example image using the trained convolutional neural network 240. For each pixel in the example image, the saliency map can provide how likely the pixel belongs to a salient object (or salient region).

The language model engine 244 may be a module executed by the processor 236 that is configured to predict an image and/or features of the image given an arbitrary input query. When training the neural language model to simulate or predict a class, the processor 236, using the language model engine 244, trains the neural language model that a class is a set of weights against those features that the deep learning model produced as part of the vision model, which is what the neural language model would learn. The neural language model is trained to learn to match the direction of the feature vector produced by the vision model (e.g., after the average-over-width-height layer of the convolution neural network 240) for an image that is highly correlated to a given class. For example, for a given class "tree", the trained neural language model may return an arbitrary number of primary features that identify the class "tree", which corresponds to the features recognized by the vision model. A given class (or concept) may be represented over a number of dimensions, and the convolutional neural network 240 may be allowed to use up to D features to identify the given class, where D is a positive integer. In one or more implementations, the processor 236, using the language model engine 244, obtains raw outputs of the class weights from the vision model (e.g., the spatial outputs from a spatial operator layer of the convolutional neural network 240) via the vision model engine 243. The processor 236, using the language model engine 244, feeds the raw class weights through the neural language model (e.g., the convolutional neural network 240) to generate a new set of class weights for that query (including queries not seen or trained against). In this respect, the neural language model with the new class weights attempts to learn how to map a query to the same manifold that the vision model learned.

The index engine 246 may be a module executed by the processor 236 that is configured to index an image collection (e.g., the collection of images 252). Indexing may involve a drastic dimensionality reduction, from a native dimensionality of about 2.5 k dimensions down to 256 dimensions to keep it attractive from a storage and search standpoint. In one or more implementations, the deep learning model implements a layer that takes an image of arbitrary aspect ratio and converts the image down to a fixed size grid, by averaging neighbor areas (e.g., 5×20 aspect ratio→5×4 size grid), hence resulting in an index of downsized images. In this respect, the image vectors of the grid for each image in the image collection are indexed.

The index data 256 may be a data structure including an array of entries, where each entry includes information relating to an image and the corresponding downsized image. For example, the index data 256 may include a vector representation of the downsized image as well as associated metadata indicating one or more image identifiers and/or keywords for the image. In one or more implementations, an index compression technique is applied to the index of images. If a single vector per image is stored, where each image includes a grid of decomposed cells (e.g., 8×8 grid), then the size of the index based on a vector per image being stored translates into a very large index. Instead of storing a vector for each cell in the grid, the processor 236, using the index engine 246, may store a predetermined number of vectors that describe a subspace within the image (e.g., a vector for each primary direction of the image) based on all spatial vectors for that image using either principle components analysis (PCA) or a k-means clustering technique. The index engine 246 stores three vectors in some implementations, and stores four vectors in other implementations, but the number of vectors retained may vary depending on implementation.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

At runtime, given an arbitrary text query, the trained language model can construct a vector that matches the image that also is associated with that query. For example, the neural language model learns to construct a vector that points in approximately the same direction as the feature vectors produced by the convolutional neural network 240 in the vision model for images highly related to the given text query. In other words, images representing the given query are expected to be densely located somewhere on the visual manifold, and the neural language model learns to construct a vector that is roughly through the center of that cluster. In this respect, the training data teaches the neural network how to learn the concept of an object, and how that maps to an image. The processor 236, using the image search engine 242, then takes a dot product of the vector that the neural language model generated, for every cell within the grid, across every image in the image collection (e.g., the index data 256).

The processor 236, using the image search engine 242, performs a ranking based on how well the two vectors match. In one or more implementations, the vector from the neural language model is compared to an indexed vector from the deep learning model. The comparison may determine that both vectors indicate a representation of a "biker", as well as where are the representations of the "biker" relative to each other. For example, if the processor 236, using the image search engine 242, is analyzing the top left cell of a saliency map, and the image search engine 242 is looking for a representation of a "biker" in that cell against the query vector, where the query vector based on the user input indicates that the representation of the "biker" should be in a bottom-right cell, then the image search engine 242 issues a lower score than if the image search engine 242 was in the bottom-right cell looking for the representation of the "biker". Given the scores determined using the image search engine 242, the image search engine 242 could sort or rank the set of the images to produce a search result. The processor 236 may then provide the search result to the application 222 on the client 110 over the network 150 for display by an output device 214 of the client 110.

FIG. 3A illustrates an example offline process 300 of training a convolutional neural network for identification of composition with localization in an image using the example server of FIG. 2. While FIG. 3A is described with reference to FIG. 2, it should be noted that the process steps of FIG. 3A may be performed by other systems. The process 300 begins by proceeding from start step to step 301 where the processor 236, using the behavioral data engine 245, obtains session logs associated with one or more users.

Subsequently, in step 302, the processor 236, using the behavioral data engine 245, extracts the most popular search queries from the obtained session logs. Next, in step 303, for each extracted search query, the processor 236, using the image search engine 242, determines a set of images from an image collection (e.g., 252). Subsequently, in step 304, each image in each set of images is decomposed into a set of saliency regions for the image.

Next, in step 305, a set of training data 248 (e.g., training images) for each object class is fed through a convolutional neural network 240. For example, the convolutional neural network 240 can consist of a stack of six layers with weights, the first five layers being convolutional layers and the remaining layer being a fully-connected layer that serves as the classifier. The set of training data 248 can be fixed-size 242×242 pixel Black-White image data or Red-Green-Blue (RGB) image data. In one or more implementations, the set of training data 248 includes a data file containing pixel data for each training image. The set of training data 248 may include a different set of training images for each object class. For example, the set of training data 248 may include positive instances of a desired object class. The number of sets (or instances) of the training data included in the set of training data 248 may be an arbitrary number and may vary depending on implementation.

The convolutional neural network 240 may transform pixel data of each training image in the set of training images into a feature descriptor vector. For example, the convolutional neural network 240 extracts feature descriptors from the training images. The convolutional neural network 240 processes the set of training data 248 in order to learn to identify a correlation between an image and an object classification by analyzing pixel data of the image. Training with the set of training data 248 may be regularized by weight decay, and the learning rate may initially be set to $10^{-2}$ and then decreased by a factor of 10 when validation set accuracy stops improving for the convolutional neural network 240. The feature extraction algorithm executed by the convolutional neural network 240 may be implemented with a single fully connected layer of the convolutional neural network 240 in some embodiments, or with three fully connected layers of the convolutional neural network 240 in other embodiments.

Subsequently, in step 306, for each decomposed image, features are extracted from each saliency region of the image using a convolutional neural network (e.g., 240). In step 307, the convolutional neural network produces a feature descriptor vector for the saliency region from the extracted features of the saliency region.

Next in step 308, for each object class, the convolutional neural network 240 is trained to recognize an object in a region of an image as salient from the feature descriptor vectors. The convolutional neural network 240 may be trained to identify the most salient objects and their location within the image. The convolutional neural network 240 may be trained to first classify the image to a class. To compute the saliency of a region in the classified image, the convolutional neural network 240 may be trained to evaluate the contrast between the considered region (i.e., a region with a foreground object) and its surrounding area as well as the rest of the image (e.g., any background objects). Next in step 309, the trained convolutional neural network 240 is provided to recognize salient objects (or regions) with localization in images at runtime. The process to produce a vision model (or classifier) ends following step 309.

Figure 3B:
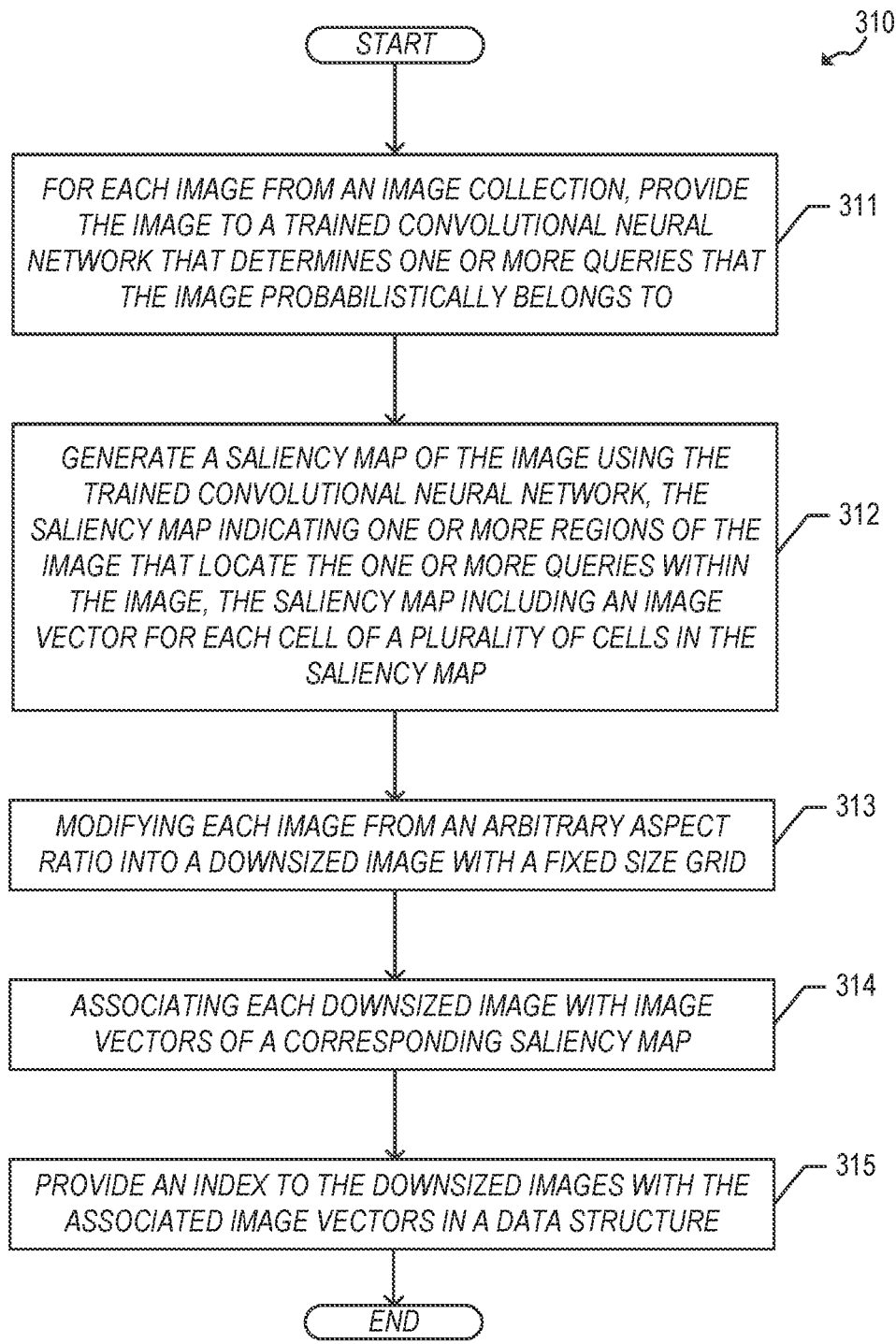
FIG. 3B illustrates an example offline process of constructing an index of images using the example server of FIG. 2.

FIG. 3B illustrates an example offline process 310 of constructing an index of images using the example server of FIG. 2. While FIG. 3B is described with reference to FIG. 2, it should be noted that the process steps of FIG. 3B may be performed by other systems. The process 310 begins by proceeding from start step to step 311 where for each image from the collection of images 252, the processor 236 feeds the image to a trained convolutional neural network (e.g., vision model engine 244) to determine one or more queries that the image probabilistically belongs to.

Next, in step 312, the processor 236, using the vision model engine 243, generates a saliency map of the image using the trained convolutional neural network 240. In one or more implementations, the saliency map indicates one or more regions of the image that locate the one or more queries within the image. In one or more implementations, the saliency map includes an image vector for each cell of a plurality of cells in the saliency map.

Subsequently, in step 313, the processor 236, using the index engine 246, modifies each image from an arbitrary aspect ratio into a downsized image with a fixed size grid. Next, in step 314, the processor 236, using the index engine 246, associates each downsized image with image vectors of a corresponding saliency map. In step 315, the processor 236, using the index engine 246, provides an index to the downsized images with the associated image vectors in a data structure (e.g., the index data repository 256).

Figure 3C:
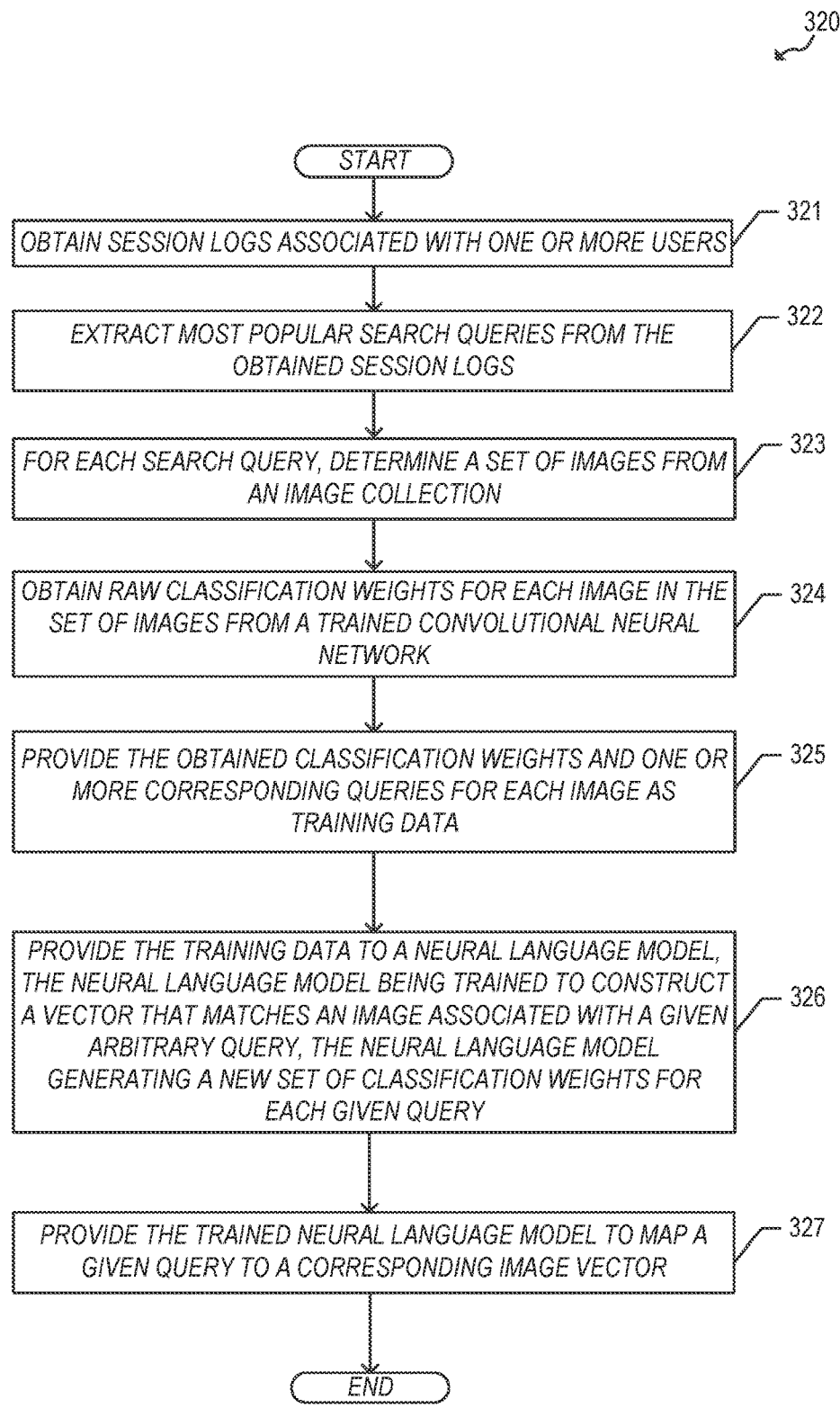
FIG. 3C illustrates an example offline process of training a convolutional neural network for identification of an image given a query using the example server of FIG. 2.

FIG. 3C illustrates an example offline process 320 of training a convolutional neural network for identification of an image given a query using the example server of FIG. 2. While FIG. 3C is described with reference to FIG. 2, it should be noted that the process steps of FIG. 3C may be performed by other systems. The process 320 begins by proceeding from start step to step 321 where the processor 236, using the behavioral data engine 245, obtains session logs associated with one or more users.

Next, in step 322, the processor 236, using the behavioral data engine 245, extracts the most popular search queries from the obtained session logs. Subsequently, in step 323, the processor 236, using the image search engine 242, determines a set of images from an image collection for each extracted search query. Next, in step 324, the processor 236, the processor 236, using the language model engine 244, obtains raw classification weights for each image in the set of images from a trained vision model (e.g., the convolutional neural network 240 executed with the vision model engine 243).

Subsequently, in step 325, the processor 236, using the language model 244, provides the obtained classification weights and one or more corresponding queries for each image as training data. Next, in step 326, the processor 236, using the language model 244, provides the training data to a neural language model (e.g., the convolutional neural network 240 executed with the language model engine 244). In one or more implementations, the neural language model is trained to construct a vector that matches an image associated with a given arbitrary query. In one or more implementations, the neural language model generates a new set of classification weights for each given query. In step 327, the processor 236, using the language model engine 246, provides the trained neural language model to map a given query to a corresponding image vector.

Figure 3D:
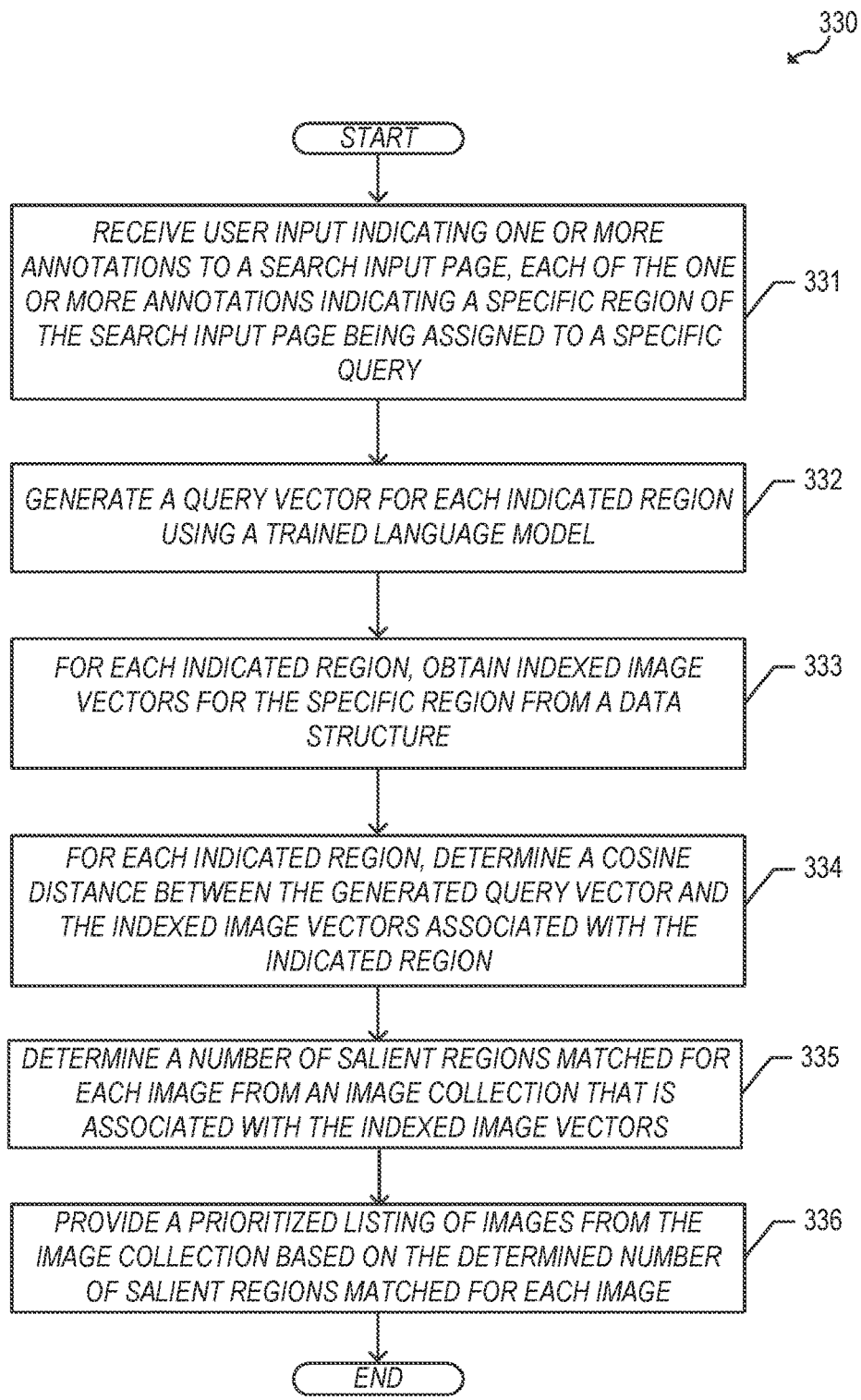
FIG. 3D illustrates an example runtime process of composition aware image querying the example server of FIG. 2.

FIG. 3D illustrates an example runtime process 330 of composition aware image querying the example server of FIG. 2. While FIG. 3D is described with reference to FIG. 2, it should be noted that the process steps of FIG. 3D may be performed by other systems.

The process 330 begins by proceeding from start step to step 331 where the image search engine 242 receives user input indicating one or more annotations to a search input page. In one or more implementations, each of the one or more annotations indicates a specific region of the search input page being assigned to a specific query.

Next, in step 332, the processor 236, using the language model engine 244, generates a query vector for each indicated region using a trained language model (e.g., the convolutional neural network 240). Subsequently, in step 333, the processor 236, using the index engine 246, for each indicated region, obtains indexed image vectors for the specific region from a data structure (e.g., index data 256). Next, in step 334, the processor 236, using the image search engine 242, for each indicated region, determines a cosine distance between the generated query vector and the indexed image vectors associated with the indicated region.

Subsequently, in step 335, the processor 236, using the image search engine 242, determines a number of salient regions matched for each image from an image collection that is associated with the indexed image vectors. In step 336, the processor 236, using the image search engine 242, provides a prioritized listing of images from the image collection based on the determined number of salient regions matched for each image.

Figure 4:
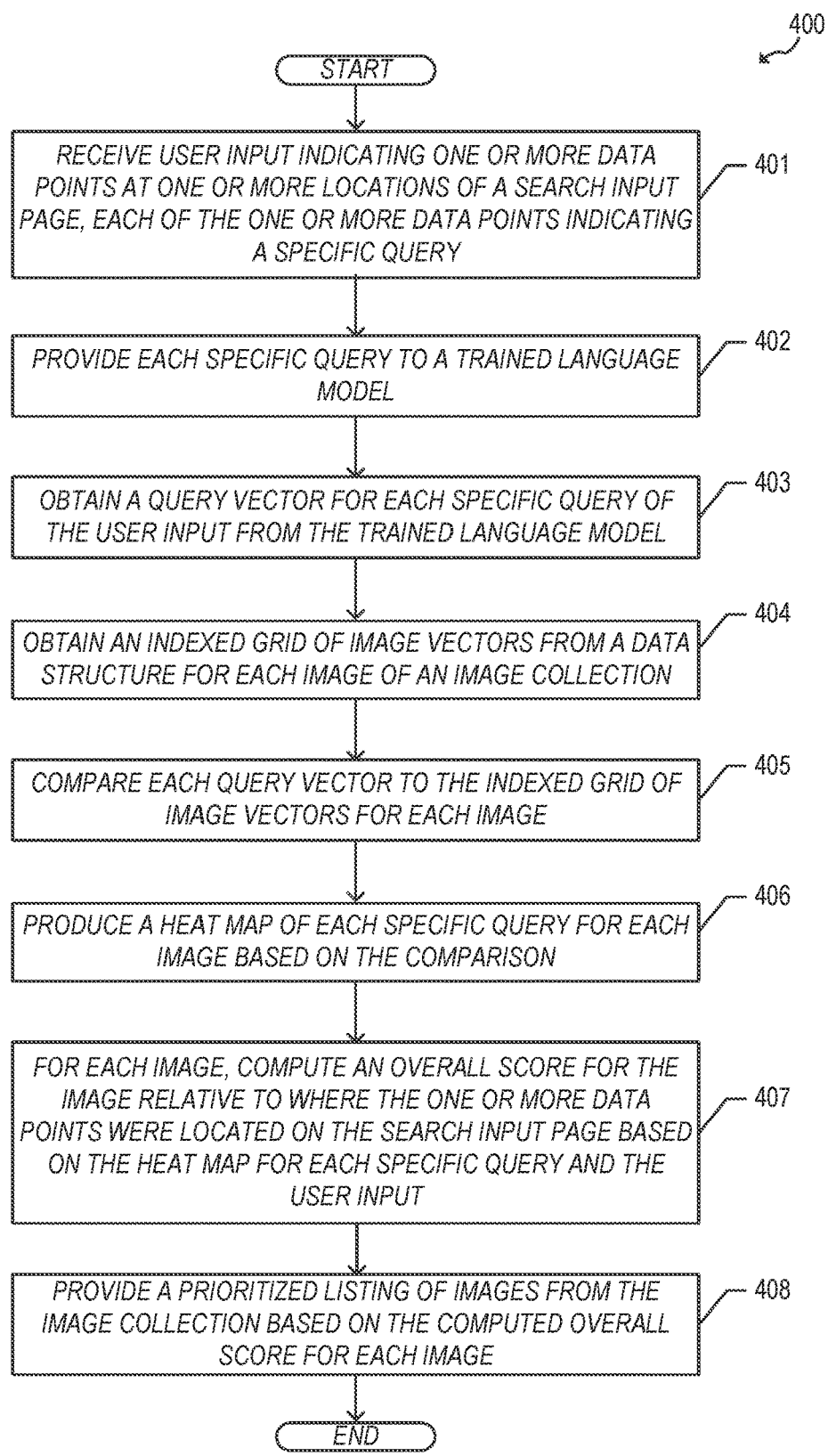
FIG. 4 illustrates an example runtime process of processing user input for composition aware image querying using the example server of FIG. 2.

FIG. 4 illustrates an example runtime process 400 of processing user input for composition aware image querying using the example server of FIG. 2. While FIG. 4 is described with reference to FIG. 2, it should be noted that the process steps of FIG. 4 may be performed by other systems. The process 400 begins by proceeding from start step to step 401 where the image search engine 242 receives user input indicating one or more data points at one or more locations of a search input page. In one or more implementations, each of the one or more data points indicates a specific query.

Next, in step 402, the processor 236 provides each specific query to a trained language model (e.g., the convolutional neural network 240). Subsequently, in step 403, the processor 236, using the language model engine 244, obtains a query vector for each specific query of the user input from the trained language model. Next, in step 404, the processor 236, using the index engine 246, obtains an indexed grid of image vectors from a data structure (e.g., the index data 256) for each image of an image collection.

Subsequently, in step 405, the processor 236, using the image search engine 242, compares each query vector to the indexed grid of image vectors for each image. Next, in step 406, the processor 236, using the image search engine 242, produces a heat map of each specific query for each image based on the comparison. Subsequently, in step 407, for each image, the processor 236, using the image search engine 242, computes an overall score for the image relative to where the one or more data points were located on the search input page based on the heat map for each specific query and the user input. In step 408, the processor 236, using the image search engine 242, provides a prioritized listing of images from the image collection based on the computed overall score for each image.

Figure 5:
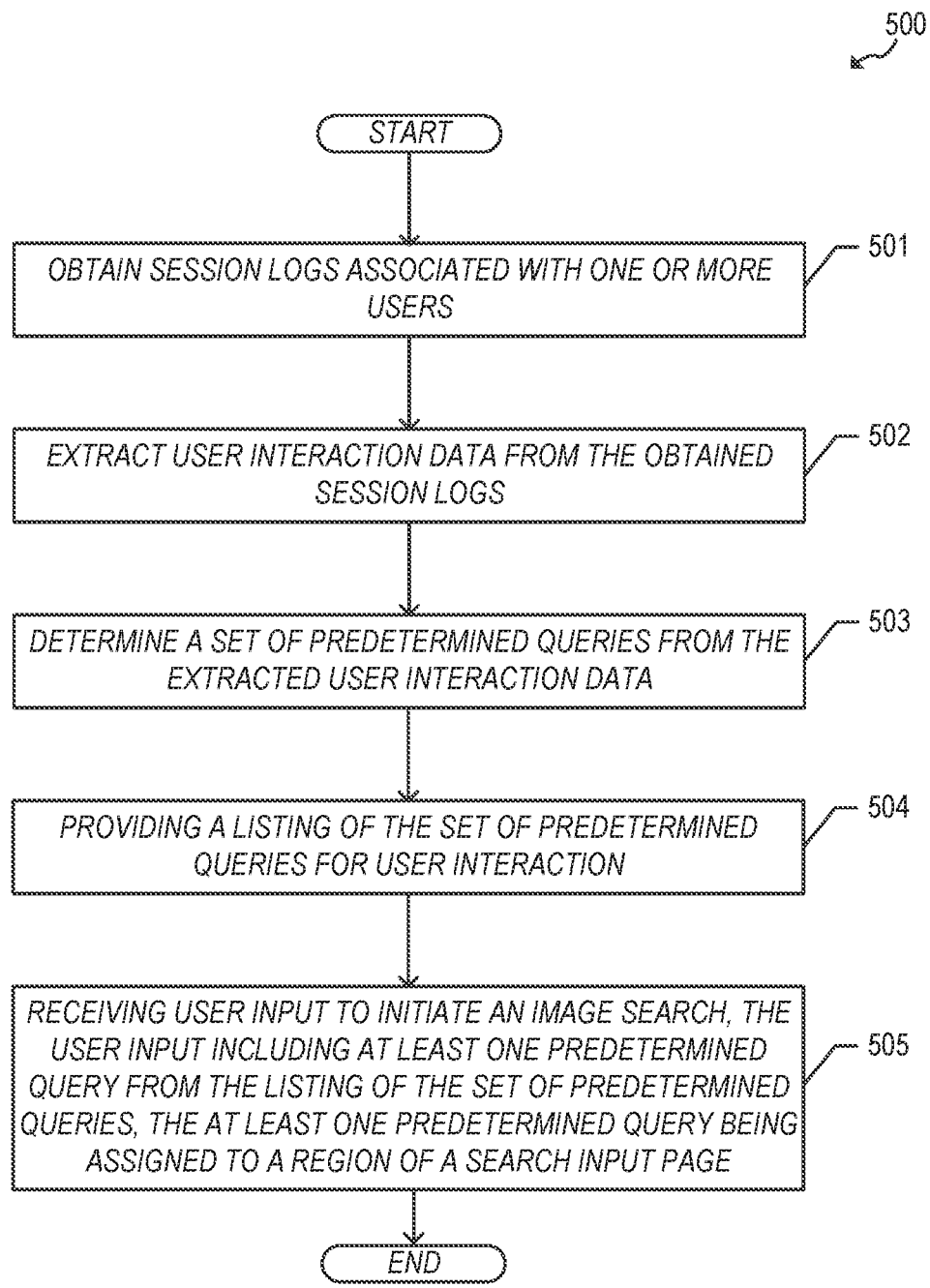
FIG. 5 illustrates an example process of identifying predetermined queries for composition aware image querying using the example server of FIG. 2.

FIG. 5 illustrates an example process 500 of identifying predetermined queries for composition aware image querying using the example server of FIG. 2. While FIG. 5 is described with reference to FIG. 2, it should be noted that the process steps of FIG. 5 may be performed by other systems. The process 500 begins by proceeding from start step to step 501 where the processor 236, using the behavioral data engine 245, obtains session logs associated with one or more users.

Next, in step 502, the processor 236, using the behavioral data engine 245, extracts user interaction data (e.g., the user interaction data 254) from the obtained session logs. Subsequently, in step 503, the processor 236, using the behavior data engine 245, determines a set of predetermined queries from the extracted user interaction data. Next, in step 504, the processor 236, using the image search engine 242 and the behavioral data engine 245, provides a listing of the set of predetermined queries for user interaction.

In step 505, the image search engine 242, receives user input to initiate an image search. In one or more implementations, the user input includes at least one predetermined query from the listing of the set of predetermined queries. In one or more implementations, the at least one predetermined query is assigned to a region of a search input page.

Figure 6:
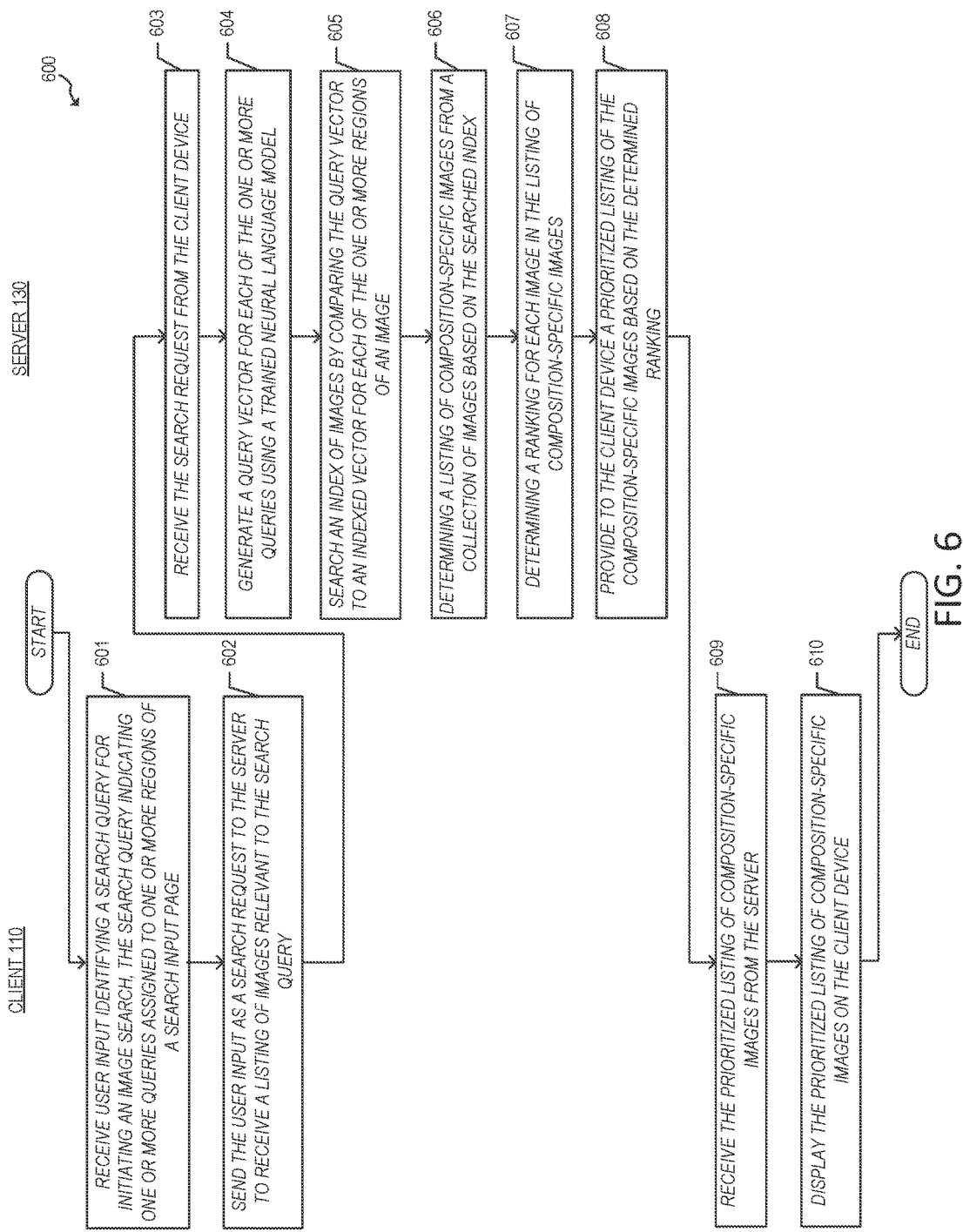
FIG. 6 illustrates an example process for content search by composition aware image querying using the example client and server of FIG. 2.

FIG. 6 illustrates an example process 600 for content search by composition aware image querying using the example client and server of FIG. 2. The process 600 begins in step 601 when a user, for example, loads an application 222 on a client 110 and the client 110 receives an input from the user using the input device 216 for a search query to initiate an image search through the collection of images 252.

The input identifies one or more search queries in a given natural language for initiating the image search. In one or more implementations, the input includes location information indicating a spatial relationship between two or more search queries at one or more regions of a search input page of the application 222. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member. The user can utilize the input device 216 to submit one or more search terms and localization of such terms as part of a text-based search query via a user interface of the application 222.

Next, in step 602, the application 222 on the client 110 sends the user input as a search request to the server 130 in order to receive a listing of images responsive to the text-based search query. Turning to the server 130, in step 603, the server 130 receives the search request for a listing of images from the client 110. Subsequently, in step 604, the server 130 generates a query vector for each of the one or more queries using a trained neural language model (e.g., the language model engine 244 and the convolutional neural network 240).

Next, in step 605, the server 130 searches an index of images by comparing the query vector to an indexed vector for each of the one or more regions of an image. Subsequently, in step 606, the server 130 determines a listing of composition-specific images from a collection of images (e.g., the collection of images 252) based on the searched index. Next, in step 607, the server 130 determines a ranking for each image in the listing of composition-specific images.

In step 608, the server 130 provides to the client 110 a prioritized listing of the composition-specific images based on the determined ranking. Turning back to the client 110, in step 609, the client 110 receives the prioritized listing of composition-specific images from the server 130. Next, in step 610, the listing of composition-specific images is provided for display via the application 222 of the client 110.

Figure 7:
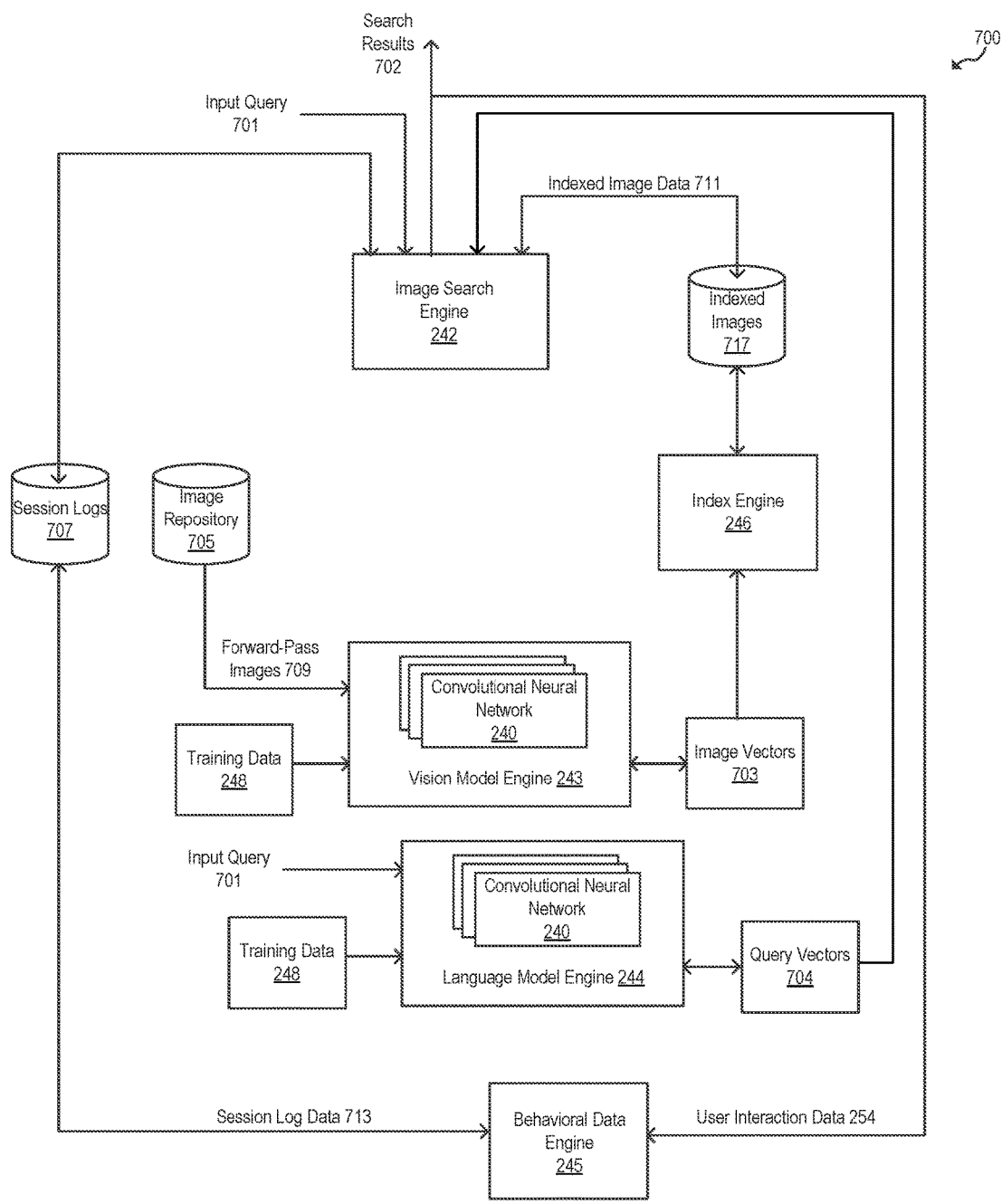
FIG. 7 illustrates a schematic diagram of an example architecture suitable for practicing the example process of FIGS. 3A-3D and 6.

FIG. 7 illustrates a schematic diagram 700 of an example architecture suitable for practicing the example process of FIGS. 3A-3D and 6. In FIG. 7, the architecture 700 provides for an input search query to search for and retrieve a set of images that map, or at least in part, to a specific composition indicated by the input search query.

In one or more implementations, the processor 236, using the vision model engine 243, trains the convolutional neural network 240 that learns how to map an image to one of a predetermined number of queries (e.g., 6600 top queries). In some aspects, a certain subset of queries may be popular, e.g., abstract, background, man, woman smile type queries. In one or more implementations, the processor 236, using the image search engine 242, obtains a set of images for each query from the image repository 705 using the forward-pass images 709.

In one or more implementations, the processor 236, using the vision model engine 243, trains a deep learning model (e.g., the convolutional neural network 240) using the training data 248, where the deep learning model is trained to predict which query an image is more likely to belong to given the image.

As a result, based on the architecture of the deep learning model, the processor 236 may obtain localization from the image. The deep learning model can respond directly by indicating where are the mostly likely areas in an image that indicate where the query "man", for example, was located, and/or why the deep learning model indicated there was a representation of a "man" within the image.

The processor 236 can use the trained deep learning model to index an image collection (e.g., the collection of images 252). Indexing may involve a drastic dimensionality reduction, from a native dimensionality of about 2.5 k dimensions down to 256 dimensions to keep it attractive from a storage and search standpoint. In one or more implementations, the deep learning model Implements a layer that takes an image of arbitrary aspect ratio and converts the image down to a fixed size grid, by averaging neighbor areas (e.g., 5×20 aspect ratio→5×4 size grid), hence resulting in an index of downsized images (e.g., 717). In this respect, the image vectors of the grid (e.g., 703) for each image in the image collection are indexed.

In one or more implementations, an index compression technique is applied to the index of images. If a single vector per image is stored, where each image includes a grid of decomposed cells (e.g., 8×8 grid), then the size of the index based on a vector per image being stored translates into a very large index. Instead of storing a vector for each cell in the grid, the processor 236, using the index engine 246, stores three vectors that describe a subspace within the image. For example, the index engine 246 may store three weights that describe where in that subspace each cell is located. The three weights may be stored in the index data repository 256. The query may be compared against the dot product of the three weights. In a single image, the deep learning model is learning to suppress the non-important regions of an image, and maximize the important regions. In this respect, there is a certain amount of consistency of the vectors in a spatial manner. The processor 236, using the vision model engine 243, may cluster the cloud of 64 points (e.g., the 8×8 grid), and may determine three important directions of where those points lie in. Instead of storing a vector for each one of the spatial positions (or cells of the 8×8 grid), the processor 236, using the index engine 246, stores the three main vectors. The processor 236, using the index engine 246, then stores for each cell, three floating point values that describe the distance along each of those three vectors with respect to each cell of the grid. The benefit is to reduce the index from 64× down to about 3× the full size of the image collection.

In one or more implementations, instead of indexing vectors in a spatial manner, the processor 236, using the index engine 246, indexes the top K set of labels that the vision model predicts (e.g., bottom-left corner of image includes a representation of a "biker" and a representation of "grass"). In one or more implementations, instead of doing a query-to-vector translation (e.g., mapping some arbitrary text string to a vector), the processor 236, using the image search engine 242 and the language model engine 244, performs a bag-of-words match on each location of the image (e.g., each grid location) to determine a fitness for that grid location.

In one or more implementations, the processor 236, using the language model engine 244, trains a neural language model (e.g., the convolutional neural network 240) with the training data 248 that includes, for example, the top 1 million queries. The number of queries for training the neural language model can be an arbitrary number.

In one or more implementations, the processor 236, using the language model engine 244, obtains raw outputs of the class weights from the vision model via the vision model engine 243. The processor 236, using the language model engine 244, feeds the raw class weights through the neural language model (e.g., the convolutional neural network 240) to generate a new set of class weights for that query (including queries not seen or trained against). In this respect, the neural language model with the new class weights attempts to learn how to map a query to the same manifold that the vision model learned.

The neural language model simulates the classification weights, whereas a traditional multinomial classifier feeds the learned classification weights as output to a softmax layer to produce a probability distribution over the classes. In the traditional multinomial classifier, each class weight is represented as a vector. In this respect, if the number of features that the classifier produces is 2.5 k, then each class has 2.5 k weights. The traditional multinomial classifier applies those weights to all the features of an image, and then sums the weights together (i.e., a dot product) for all the classes, and runs the dot product through the softmax layer.

When a user submits a query, the processor 236, using the index engine 246, can index all of the language queries to have the set of vectors for caching, or use the neural language model to generate the language queries on-the-fly. In FIG. 7, the processor 236, using the neural language model generates a new set of weights every time for every query. In one or more implementations, if the neural language model generates vectors for the same query twice, it will be the same vector because the neural language model is deterministic. In one or more implementations, the processor 236, using the behavioral data engine 245, mines session logs using the session log data 713 to determine a number of predetermined icons, and prepopulates a user interface of the application 222 at the client 110 with a listing of predetermined query icons that a user can select and submit as a language query as part of the user interaction data 254.

When the processor 236, using the vision model engine 243, is harvesting features from the deep neural network (e.g., the convolutional neural network 240), the deep neural network is giving back a set of features in a saliency map, where each dimension is a feature of an image and floating point value for that feature. When training the neural language model to simulate or predict a class, the processor 236, using the language model engine 244, trains the neural language model that a class is a set of weights against those features that the deep learning model produced as part of the vision model, which is what the neural language model would learn. The neural language model is trained to learn to match the direction of the feature vector produced by the vision model (e.g., after the average-over-width-height layer of the convolution neural network 240) for an image that is highly correlated to a given class. For example, for a given class "tree", the trained neural language model may return an arbitrary number of primary features that identify the class "tree", which corresponds to the features recognized by the vision model.

At runtime, given an arbitrary text query (e.g., 701), the trained language model can construct a vector that matches the image that also is associated with that query. For example, the neural language model learns to construct a vector that points in approximately the same direction as the feature vectors produced by the convolutional neural network 240 in the vision model for images highly related to the given text query. In other words, images representing the given query are expected to be densely located somewhere on the visual manifold, and the neural language model learns to construct a vector that is roughly through the center of that cluster. In this respect, the training data teaches the neural network how to learn the concept of an object, and how that maps to an image. The processor 236, using the image search engine 242, then takes a dot product of the vector that the neural language model generated, for every cell within the grid, across every image in the image collection.

The processor 236, using the image search engine 242, performs a ranking based on how well the two vectors match. In one or more implementations, the vector from the neural language model is compared to an indexed vector from the deep learning model. The comparison may determine that both vectors indicate a representation of a "biker", as well as where are the representations of the "biker" relative to each other. For example, if the processor 236, using the image search engine 242, is analyzing the top left cell of a saliency map, and the image search engine 242 is looking for a representation of a "biker" in that cell against the query vector (e.g., 704), where the query vector based on the user input indicates that the representation of the "biker" should be in a bottom-right cell, then the image search engine 242 issues a lower score than if the image search engine 242 was in the bottom-right cell looking for the representation of the "biker". Given the scores determined using the image search engine 242, the image search engine 242 may sort or rank the set of the images to produce a search result (e.g., 702).

In one or more implementations, the cosine distance between the vectors indicates the angle between two data points on the search input page of the application 222. If the cosine distance is minimized (i.e., the angle is minimized), then the similarity of the two concepts is maximized. In this respect, if their angle is minimized, then the visual concept of the "biker" (e.g., the indexed vector) and the query concept of the "biker" (e.g., query vector 704) are very likely the same.

In one or more implementations, a threshold is applied to the ranking to reduce the set of images in the ranking. For example, the threshold may indicate a cosine distance threshold, where the image is not kept or considered for the ranking when the cosine distance is negative. In another aspect, the image is not kept for the ranking when the cosine angle difference between the vectors is greater than a predetermined angle (e.g., 90 degrees).

Figure 8:
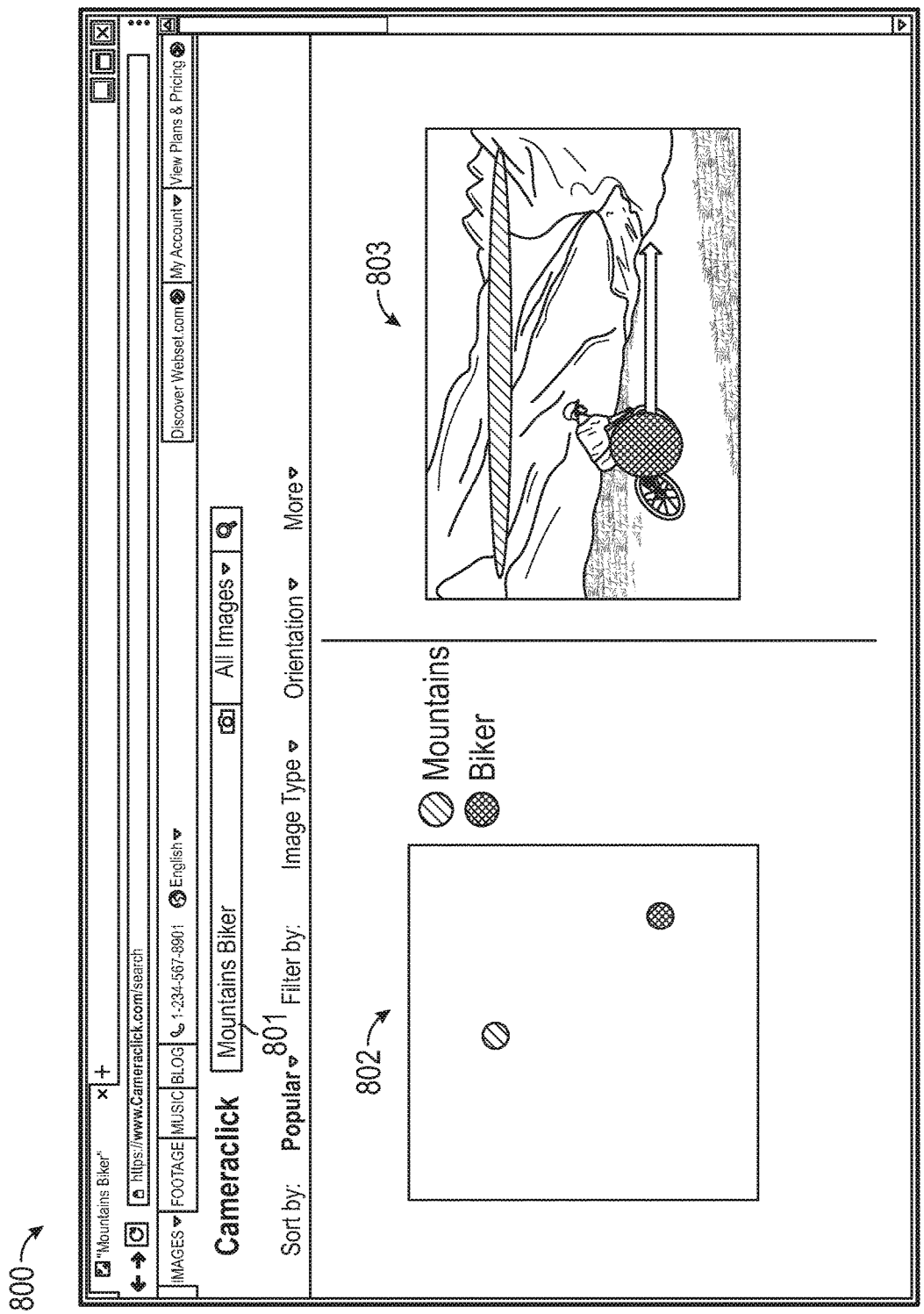
FIGS. 8 and 9 illustrate examples of a user interface for practicing the example process of FIG. 4.

FIG. 8 illustrates an example of a user interface 800 for practicing the example process of FIG. 4 via the application 222 of the client 110. In one or more implementations, the user interface 800 includes an input search query 801 and a search input page 802 (e.g., a canvas), where one or more datapoints on the search input page 802 indicate respective query terms (e.g., mountains, biker). The processor 236, using the image search engine 242, feeds both data points through the trained neural language model (e.g., 240, 244), and obtains a vector for the representation of "mountains" and a vector for the representation of "biker". The processor 236, using the image search engine 242 and the index engine 246, compares each vector to an indexed grid by scoring each cell for the query "mountains", for example. In one or more implementations, the processor 236, using the language model engine 244, determines the dot product of the representation for "mountains" from the query vector for each one of the images. In this respect, the trained neural language model can produce a heat map of the representation of the "mountains" for each image. The same can be performed for the representation of the "biker", such that the processor 236 obtains a heat map for each image of where the representation of the "biker" may be located within the image. The processor 236, using the image search engine 242, uses a ranking function that takes where the user indicated the representation of the "biker" and the representation of the "mountains" should be located within the composition of an image, the heat maps for both representations of the "mountains" and "biker", and computes an overall score for the image relative to where the input data points were located on the search input page 802. The image search engine 242 then returns a search result 803 that may include one or more images with a specific composition that is relevant to the composition indicated by the input search query 801 and the search input page 802.

Figure 9:
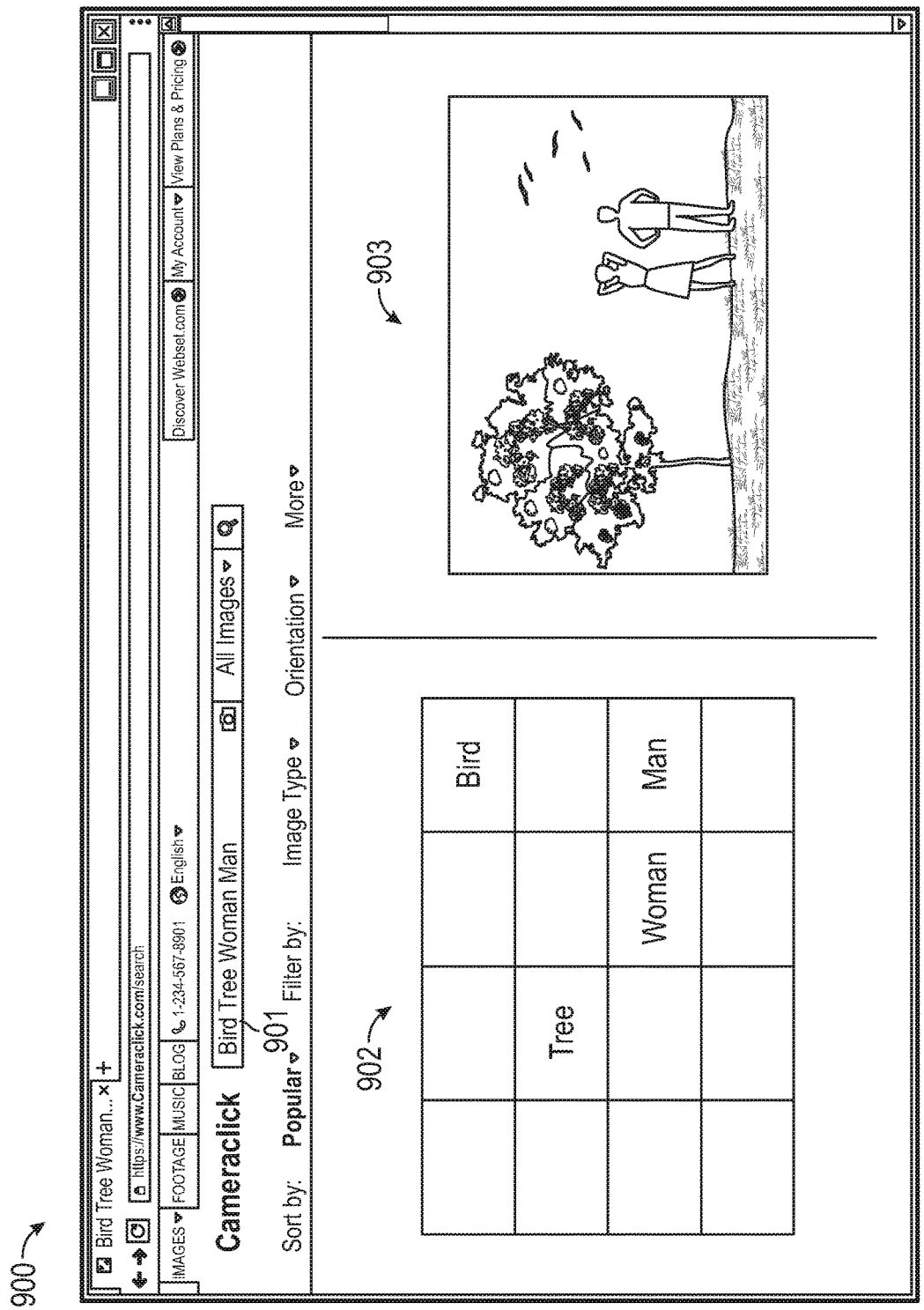

FIG. 9 illustrates an example of a user interface 900 for practicing the example process of FIG. 4 via the application 222 of the client 110. In one or more implementations, the user interface 900 includes an input search query 901 and an input grid 902 that indicates a query term in one or more cells of the input grid 902 (e.g., tree, bird, woman and man). The processor 236, using the image search engine 242, feeds the cells with the supplied query terms through the trained neural language model (e.g., 240, 244), and obtains a vector for each of the representations of "bird", "tree", "woman" and "man". The processor 236, using the image search engine 242 and the index engine 246, compares each vector to an indexed grid by scoring each cell for each of the object representations. In one or more implementations, the processor 236, using the language model engine 244, determines the dot product of each of the object representations from a corresponding query vector for each one of the images. In this respect, the trained neural language model can produce a heat map of each of the object representations for each image of where each of the object representations may be located within the image. The processor 236, using the image search engine 242, uses the ranking function that takes where the user indicated the representations of the "bird", "tree", "woman" and "man" should be located within the composition of an image, the heat maps for each of the object representations, and computes an overall score for the image relative to where the annotated grid cells were located on the search input page 902. The image search engine 242 then returns a search result 903 that may include one or more images with a specific composition that is relevant to the composition indicated by the input search query 901 and the input grid 902.

Figure 10:
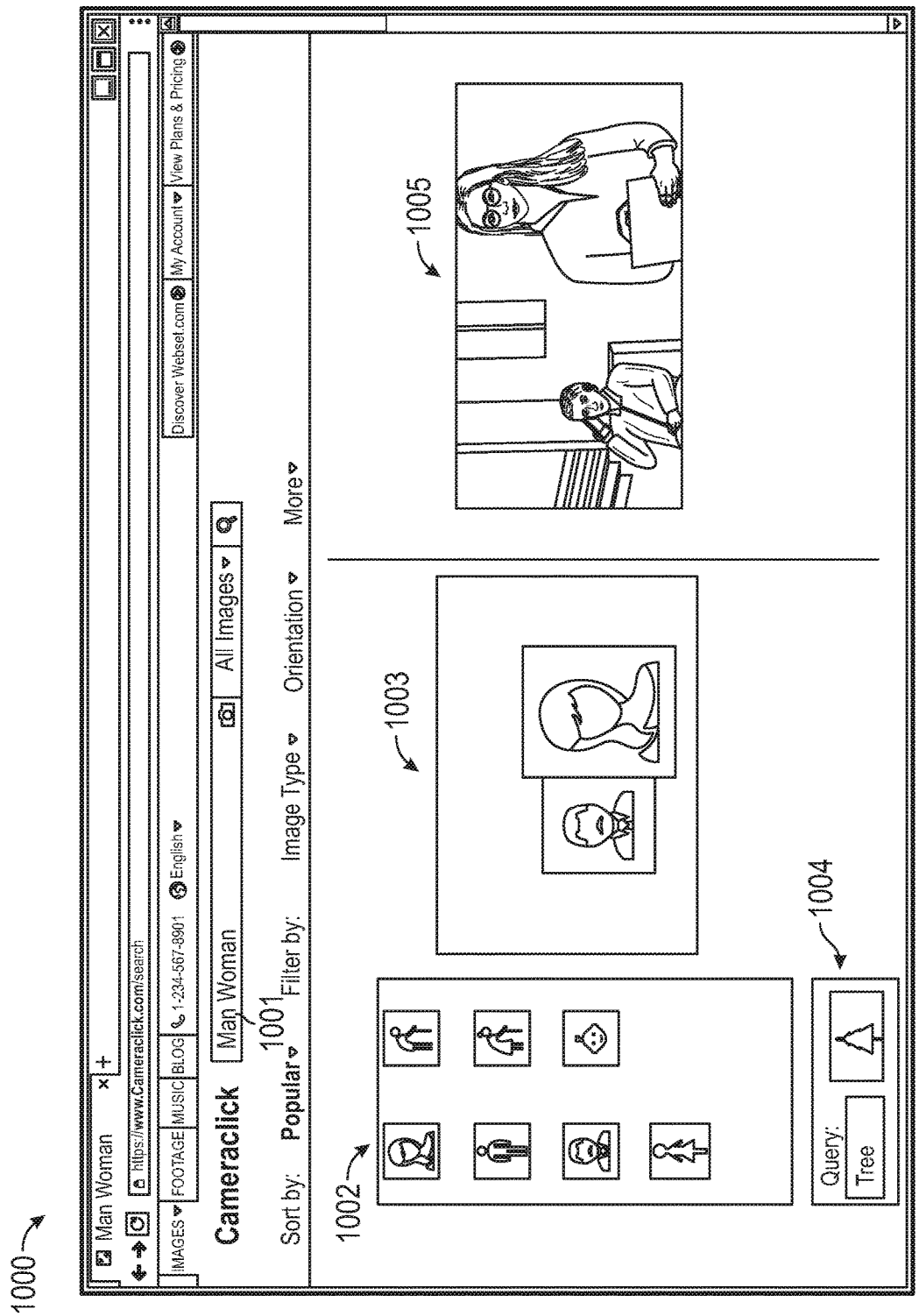
FIG. 10 illustrates an example of a user interface for practicing the example process of FIGS. 4 and 5.

FIG. 10 illustrates an example of a user interface for practicing the example process of FIGS. 4 and 5 via the application 222 of the client 110. In one or more implementations, the user interface 1000 includes an input search query 1001 and a search input page 1003 (e.g., a canvas), where one or more query icons from a listing of predetermined query icons 1002 are positioned onto the search input page 1003 based on user interaction with the listing of predetermined query icons. The search input page 1003 includes a first predetermined query icon (e.g., representation of a "woman") placed relative to a second predetermined icon (e.g., representation of a "man"), where the first predetermined icon is larger in size and partially overlapping the second predetermined query icon to indicate that the desired composition should include the representation of the "woman" in the foreground and the representation of the "man" in the background. In one or more implementations, the processor 236, using the behavioral data engine 245, mines session logs to determine a number of predetermined icons, and prepopulates the user interface 1000 with the listing of predetermined query icons 1002. In one or more implementations, the user interface 1000 includes an input field 1004 for receiving an arbitrary query term (e.g., "tree"), where the processor 236, using the neural language model, generates a query (e.g., representation of a "tree") in response to the arbitrary query term. The processor 236, using the image search engine 242, feeds both predetermined query icons through the trained neural language model (e.g., 240, 244), and obtains a vector for the representation of the "woman" and a vector for the representation of the "man". The processor 236, using the image search engine 242 and the index engine 246, compares each vector to an indexed grid by scoring each cell for the query "woman", for example. In one or more implementations, the processor 236, using the language model engine 244, determines the dot product of the representation for "woman" from the query vector and whatever is in that cell for each one of the images. In this respect, the trained neural language model can produce a heat map of the representation of the "woman" for each image. The same can be performed for the representation of the "man", such that the processor 236 obtains a heat map for each image of where the representation of the "man" may be located within the image. The processor 236, using the image search engine 242, uses a ranking function that takes where the user indicated the representation of the "woman" and the representation of the "man" should be located within the composition of an image, the heat maps for both representations of the "woman" and "man", and computes an overall score for the image relative to where the input data points were located on the search input page 1003. The image search engine 242 then returns a search result 1005 that may include one or more images with a specific composition that is relevant to the composition indicated by the input search query 1001 and the search input page 1003.

Figure 11:
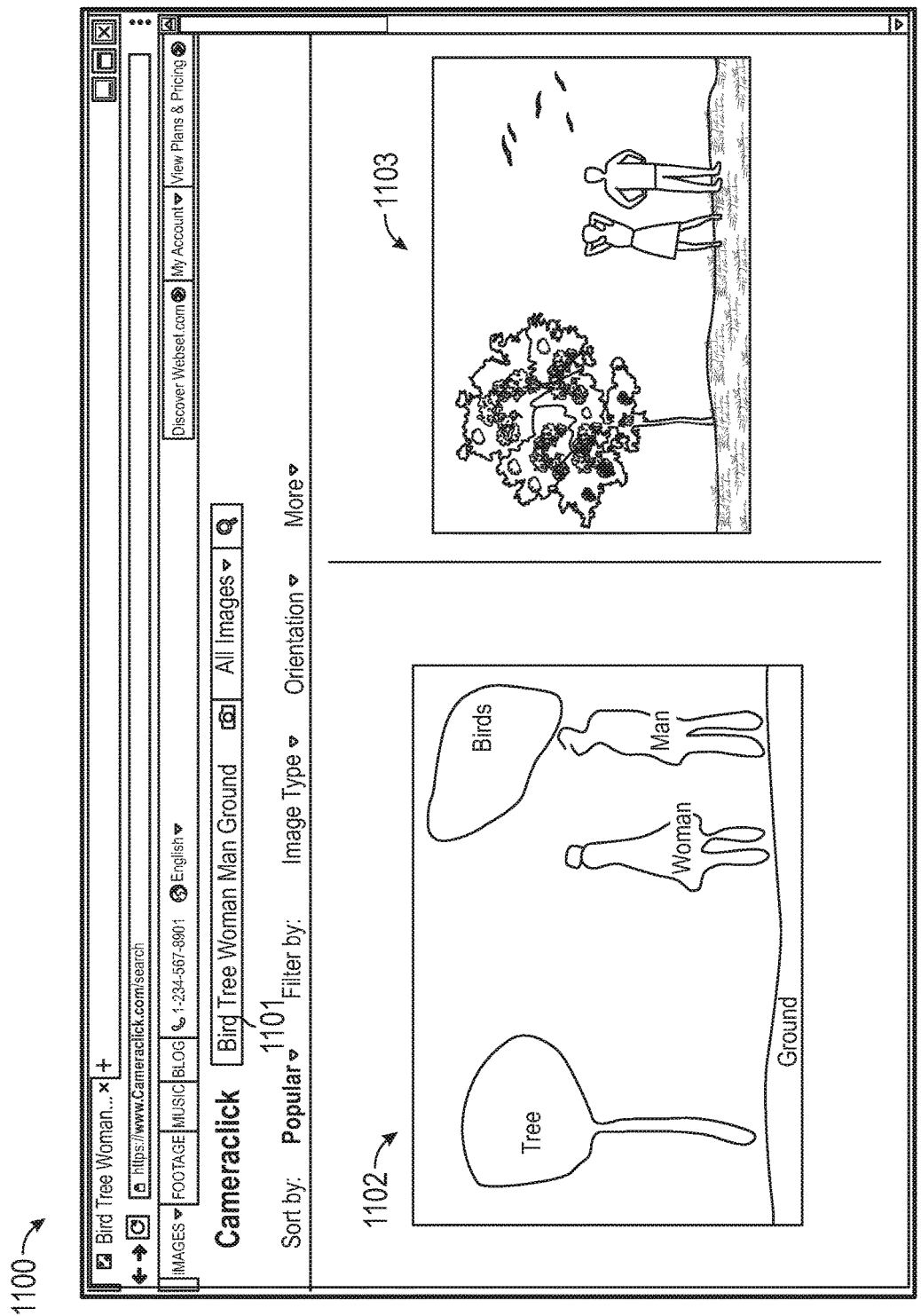
FIG. 11 illustrates an example of a user interface for practicing the example process of FIG. 4.

FIG. 11 illustrates an example of a user interface for practicing the example process of FIG. 4 via the application 222 of the client 110. In one or more implementations, the user interface 1100 includes an input search query 1101 and an input drawing canvas 1102, where user-generated drawings and annotations are input to the input drawing canvas 1102 that indicate respective representations of object. Each of the annotations indicates a respective query term for a corresponding object representation (e.g., tree, bird, woman, man, and ground). The processor 236, using the image search engine 242, feeds the user-generated drawings and annotations through the trained neural language model (e.g., 240, 244), and obtains a vector for each of the representations of "bird", "tree", "woman", "man" and "ground". The processor 236, using the image search engine 242 and the index engine 246, compares each vector to an indexed grid by scoring each cell for each of the object representations. The processor 236, using the language model engine 244, may determine the dot product of each of the object representations from a corresponding query vector for each one of the images. In this respect, the trained neural language model can produce a heat map of each of the object representations for each image of where each of the object representations may be located within the image. The processor 236, using the image search engine 242, uses the ranking function that takes where the user indicated the representations of the "bird", "tree", "woman" "man" and "ground" should be located within the composition of an image, the heat maps for each of the object representations, and computes an overall score for the image relative to where the annotated drawings were located on the input drawing canvas 1102. The image search engine 242 then returns a search result 1103 that may include one or more images with a specific composition that is relevant to the composition indicated by the input search query 1101 and the input drawing canvas 1102.

Hardware Overview

Figure 12:
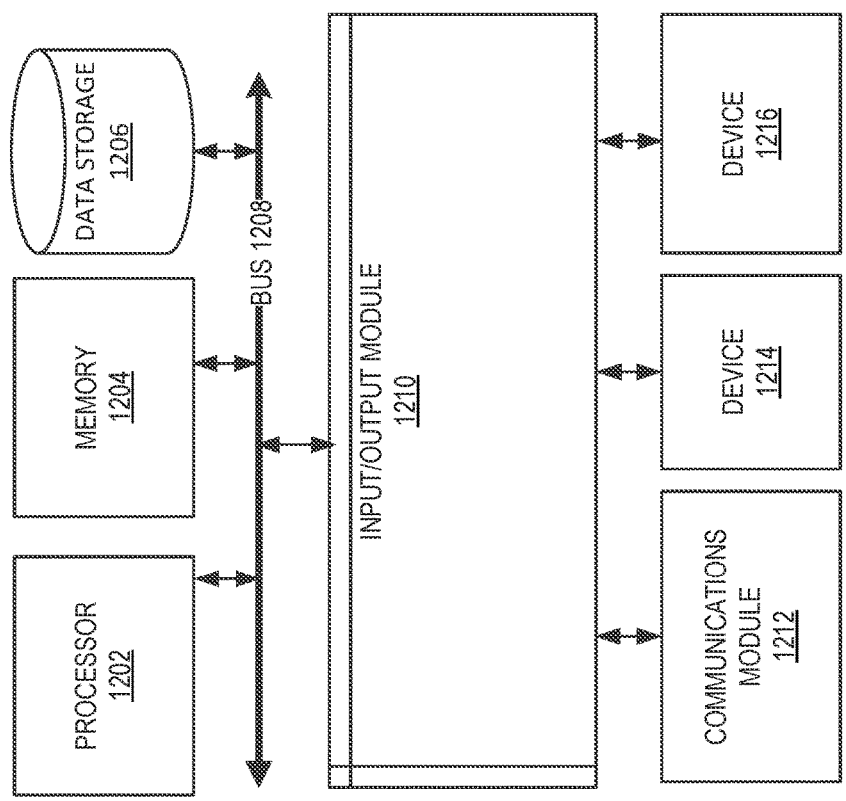
FIG. 12 is a block diagram illustrating an example computer system with which the client and server of FIG. 2 can be implemented.

FIG. 12 is a block diagram illustrating an exemplary computer system 1200 with which the client 110 and server 120 of FIG. 1 can be implemented. In certain aspects, the computer system 1200 may be implemented using hardware or a combination of software and hardware, either in a dedicated server, or integrated into another entity, or distributed across multiple entities.

Computer system 1200 (e.g., client 110 and server 120) includes a bus 1208 or other communication mechanism for communicating information, and a processor 1202 (e.g., processor 212 and 236) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, i.e., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. The input/output module 1210 can be any input/output module. Exemplary input/output modules 1210 include data ports such as USB ports. The input/output module 1210 is configured to connect to a communications module 1212. Exemplary communications modules 1212 (e.g., communications modules 218 and 238) include networking interface cards, such as Ethernet cards and modems. In certain aspects, the input/output module 1210 is configured to connect to a plurality of devices, such as an input device 1214 (e.g., input device 216) and/or an output device 1216 (e.g., output device 214). Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1216 include display devices, such as a LCD (liquid crystal display) monitor, for displaying information to the user.

According to one aspect of the present disclosure, the client 110 and server 120 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
providing a plurality of sets of training images to a computer-operated convolutional neural network, wherein the computer-operated convolutional neural network processes the plurality of sets of training images to learn to identify features relating to at least one object class of a plurality of object classes, wherein each of the plurality of sets of training images is associated with one object class of the plurality of object classes;
generating feature vectors for each training image in the plurality of sets of training images using the computer-operated convolutional neural network;
clustering the feature vectors into a plurality of clusters;
receiving, from a client device, user input identifying a search query for content, the user input indicating one or more queries assigned to one or more regions of a search input page;
generating a query vector for each of the one or more queries using a computer-operated neural language model;
comparing the query vector to an indexed vector for each of the one or more regions of an image;
based on the comparing, determining a listing of composition-specific images from a collection of images;
determining a ranking for each image in the listing of composition-specific images; and
providing a set of search results responsive to the search query to the client device, the set of search results including a prioritized listing of the composition-specific images based on the determined ranking,
wherein at least one of the plurality of clusters is associated with the search query.

2. The computer-implemented method of claim 1, further comprising:
obtaining session logs associated with one or more users;
extracting a set of most popular search queries from the obtained session logs;
for each extracted search query, determining a set of images from the collection of images; and
decomposing each image in each set of images into a set of saliency regions for the image.

3. The computer-implemented method of claim 2, further comprising:
providing a set of training images for each object class of a plurality of object classes to a computer-operated convolutional neural network, the set of training images including the decomposed images;
for each decomposed image, extracting features from each saliency region of the image using the computer-operated convolutional neural network;
obtaining a feature descriptor vector for the saliency region from the extracted features of the saliency region using the computer-operated convolutional neural network;
for each object class of the plurality of object classes, training the computer-operated convolutional neural network to recognize an object in a region of an image as salient from the feature descriptor vectors; and providing the trained computer-operated convolutional neural network to recognize salient objects with localization in images.

4. The computer-implemented method of claim 1, further comprising:

for each image in the collection of images, providing the image to a trained computer-operated convolutional neural network that determines one or more queries that the image probabilistically belongs to;

generating a saliency map of the image using the trained computer-operated convolutional neural network, the saliency map indicating one or more regions of the image that locate the one or more queries within the image, the saliency map including an image vector for each cell of a plurality of cells in the saliency map;

modifying each image from an arbitrary aspect ratio into a downsized image with a fixed size grid;

associating each downsized image with image vectors of a corresponding saliency map; and providing an index to the downsized images with the associated image vectors in a data structure.

5. The computer-implemented method of claim 1, further comprising:

obtaining session logs associated with one or more users;

extracting a set of most popular search queries from the obtained session logs;

for each extracted search query, determining a set of images from the collection of images;

obtaining raw classification weights for each image in the set of images from a trained computer-operated convolutional neural network;

providing the obtained classification weights and one or more corresponding queries for each image as training data;

providing the training data to a computer-operated neural language model, the computer-operated neural language model being trained to construct a vector that matches an image associated with a given arbitrary query, the computer-operated neural language model generating a new set of classification weights for each given query; and providing the trained computer-operated neural language model to map a given query to a corresponding image vector.

6. The computer-implemented method of claim 5, wherein the computer-operated neural language model comprises a computer-operated convolutional neural network that is trained to minimize a cosine distance between the query vector and the indexed vector.

7. The computer-implemented method of claim 1, wherein the comparing comprises:

for each of the one or more regions, determining a cosine similarity between the query vector and the indexed vector associated with the region.

8. The computer-implemented method of claim 7, wherein determining the cosine similarity comprises determining a cosine angle difference between the query vector and the indexed vector.

9. The computer-implemented method of claim 1, wherein the comparing comprises determining a number of regions matched for each image from the collection of images that is associated with the indexed vectors.

10. The computer-implemented method of claim 1, further comprising:

obtaining session logs associated with one or more users;

extracting user interaction data from the obtained session logs;

determining a set of predetermined queries from the extracted user interaction data; and providing a listing of the set of predetermined queries for user interaction, the received user input including at least one predetermined query from the list of the predetermined queries, the at least one predetermined query being assigned to a region of the search input page.

11. The computer-implemented method of claim 10, further comprising:

providing for display a query input field associated with the listing of the set of predetermined queries;

receiving first user input via the query input field, the first user input indicating a query term;

determining one or more candidate queries that correspond to at least a portion of the query term;

providing for display the one or more candidate queries with the listing of the set of predetermined queries; and receiving second user input that includes at least one candidate query from the displayed one or more candidate queries, the at least one candidate query being positioned relative to the at least one predetermined query within the search input page.

12. The computer-implemented method of claim 1, further comprising:

generating processed pixel data including the feature vectors from the plurality of sets of training images;

determining a probability using the computer-operated convolutional neural network for an object class, the probability indicating a likelihood that a subject image corresponds to the object class; and providing an aggregate of probabilities that includes a probability for each object class in a set of object classes.

13. The computer-implemented method of claim 1, further comprising:

generating feature vectors for each image in the collection of images using a computer-operated convolutional neural network;

generating processed pixel data including the feature vectors for each image from the collection of images;

determining a probability using the computer-operated convolutional neural network for each pixel in the image, the probability indicating a likelihood that a region within the image is salient; and generating a saliency map using the probability of each pixel in the image, the saliency map including a saliency value for each region of a plurality of regions in the image.

14. A system comprising:

one or more processors;

a computer-readable storage medium coupled to the one or more processors, the computer-readable storage medium including instructions that, when executed by the one or more processors, cause the one or more processors to:

receive user input indicating one or more data points at one or more locations of a search input page from a client device, each of the one or more data points indicating a specific query;

provide each specific query to a trained computer-operated neural language model;

obtain a query vector for each specific query of the user input from the trained computer-operated neural language model;

obtain an indexed grid of image vectors from a data structure for each image of an image collection by
for each image in the image collection, provide the image to a trained computer-operated convolutional neural network that determines one or more queries that the image probabilistically belongs to;
generate a saliency map of the image using the trained computer-operated convolutional neural network, the saliency map indicating one or more regions of the image that locate the one or more queries within the image, the saliency map including an image vector for each cell of a plurality of cells in the saliency map;
modify each image from an arbitrary aspect ratio into a downsized image with a fixed size grid;
associate each downsized image with image vectors of a corresponding saliency map; and
provide an index to the downsized images with the associated image vectors in a data structure;
compare each query vector to the indexed grid of image vectors for each image;
based on the comparison, produce a heat map of each specific query for each image;
for each image, compute an overall score for the image relative to where the one or more data points were located on the search input page based on the heat map for each specific query and the user input; and
provide a prioritized listing of images from the image collection based on the computed overall score for each image.

15. The system of claim 14, wherein the instructions further cause the one or more processors to:
obtain session logs associated with one or more users;
extract a set of most popular search queries from the obtained session logs;
for each extracted search query, determine a set of images from the collection of images;
decompose each image in each set of images into a set of saliency regions for the image;
provide a set of training images for each object class of a plurality of object classes to a computer-operated convolutional neural network, the set of training images including the decomposed images;
for each decomposed image, extract features from each saliency region of the image using the computer-operated convolutional neural network;
obtain a feature descriptor vector for the saliency region from the extracted features of the saliency region using the computer-operated convolutional neural network;
for each object class of the plurality of object classes, train the computer-operated convolutional neural network to recognize an object in a region of an image as salient from the feature descriptor vectors; and
provide the trained computer-operated convolutional neural network to recognize salient objects with localization in images.

16. The system of claim 14, wherein the instructions further cause the one or more processors to:
obtain session logs associated with one or more users;
extract a set of most popular search queries from the obtained session logs;
for each extracted search query, determine a set of images from the collection of images;

obtain raw classification weights for each image in the set of images from a trained computer-operated convolutional neural network;
provide the obtained classification weights and one or more corresponding queries for each image as training data;
provide the training data to a computer-operated neural language model, the computer-operated neural language model being trained to construct a vector that matches an image associated with a given arbitrary query, the computer-operated neural language model generating a new set of classification weights for each given query; and
provide the trained computer-operated neural language model to map a given query to a corresponding image vector.

17. The system of claim 14, wherein the instructions further cause the one or more processors to:
obtain session logs associated with one or more users;
extract user interaction data from the obtained session logs;
determine a set of predetermined queries from the extracted user interaction data; and
provide a listing of the set of predetermined queries for user interaction, the received user input including at least one predetermined query from the list of the predetermined queries, the at least one predetermined query being assigned to a region of the search input page.

18. A computer-implemented method, comprising:
providing a plurality of sets of training images to a computer-operated convolutional neural network, wherein the computer-operated convolutional neural network processes the plurality of sets of training images to learn to identify features relating to at least one object class of a plurality of object classes, wherein each of the plurality of sets of training images is associated with one object class of the plurality of object classes;
generating feature vectors for each training image in the plurality of sets of training images using the computer-operated convolutional neural network;
clustering the feature vectors into a plurality of clusters;
receiving user input via an application on a client device to initiate an image search, the user input indicating one or more queries assigned to one or more regions of a search input page;
generating, in response to the received user input, an image search query from the received user input;
providing for transmission the image search query over a connection to a server, the server including an image search service that obtains one or more composition-specific images responsive to the image search query based on a cosine similarity between a query vector associated with the image search query and one or more indexed vectors of corresponding images from an image collection; and
receiving a set of search results responsive to the image search query from the server, the set of search results including a prioritized listing of the composition-specific images,
wherein at least one of the plurality of clusters is associated with the image search query.

* * * * *